United States Patent
Courchaine et al.

(10) Patent No.: US 9,274,285 B2
(45) Date of Patent: Mar. 1, 2016

(54) OPTICAL FIBER DISTRIBUTION CABINET FOR OUTDOOR USE

(75) Inventors: Wilfred J. Courchaine, Moore, SC (US); Anthony L. Nieves, Fountain Inn, SC (US); Alexander Hartenburg, Gray Court, SC (US)

(73) Assignee: AFL Telecommunications LLC, Duncam, SC (US)

( * ) Notice: Subject to any disclaimer, the term of this patent is extended or adjusted under 35 U.S.C. 154(b) by 0 days.

(21) Appl. No.: 14/009,539

(22) PCT Filed: Mar. 5, 2012

(86) PCT No.: PCT/US2012/027692
§ 371 (c)(1),
(2), (4) Date: Oct. 3, 2013

(87) PCT Pub. No.: WO2012/138440
PCT Pub. Date: Oct. 11, 2012

(65) Prior Publication Data
US 2014/0029908 A1    Jan. 30, 2014

Related U.S. Application Data

(60) Provisional application No. 61/471,481, filed on Apr. 4, 2011.

(51) Int. Cl.
G02B 6/00      (2006.01)
G02B 6/36      (2006.01)
G02B 6/44      (2006.01)

(52) U.S. Cl.
CPC ............... *G02B 6/3616* (2013.01); *G02B 6/44* (2013.01); *Y10T 29/49826* (2015.01)

(58) Field of Classification Search
CPC .............................. G02B 6/4452; G02B 6/445
USPC ......................................................... 385/135
See application file for complete search history.

(56) References Cited

U.S. PATENT DOCUMENTS 5,402,515 A    3/1995 Vidacovich et al.
5,945,633 A *  8/1999 Ott et al. ..................... 174/59
(Continued)

FOREIGN PATENT DOCUMENTS

WO    2011094327 A1    8/2011

OTHER PUBLICATIONS

International Search Report and Written Opinion dated Jun. 29, 2012 for corresponding PCT International Application No. PCT/US2012/027692.
(Continued)

*Primary Examiner* — Ryan Lepisto
(74) *Attorney, Agent, or Firm* — Nelson Mullins Riley & Scarborough, LLP

(57) ABSTRACT

A fiber distribution cabinet comprises an outer shell having at least one door for accessing an interior thereof. A module support frame is located inside the outer shell. At least one input distribution module, having a plurality of input distribution connector adapters, is attached to the module support frame. The cabinet further includes at least one optical splitter module attached to the support frame. The optical splitter module has a plurality of splitter connector adapters. Also provided is a connector holder support frame carrying a plurality of removable connector holders for maintaining a multiplicity of output connectors.

32 Claims, 23 Drawing Sheets

(56) References Cited

U.S. PATENT DOCUMENTS

| | | | |
|---|---|---|---|
| 2007/0036503 A1* | 2/2007 | Solheid et al. | 385/134 |
| 2007/0192817 A1* | 8/2007 | Landry et al. | 725/119 |
| 2008/0042535 A1* | 2/2008 | Guzzo et al. | 312/327 |
| 2008/0080828 A1* | 4/2008 | Leon et al. | 385/135 |
| 2009/0060439 A1 | 3/2009 | Cox et al. | |
| 2009/0263096 A1* | 10/2009 | Solheid et al. | 385/135 |
| 2011/0019966 A1 | 1/2011 | Reagan et al. | |
| 2011/0280529 A1 | 11/2011 | Herbst | |

OTHER PUBLICATIONS

"MPO Optical Fanout Module," FTTX, 2009 OFS Fitel, LLC.

* cited by examiner

OPTICAL FIBER DISTRIBUTION CABINET FOR OUTDOOR USE

BACKGROUND OF THE INVENTION

The present invention relates generally to outdoor cabinets where fiber optic connections can be made to customers of high-speed data services. More particularly, the present invention relates to an improved outdoor cabinet in which signals from feeder cables are split and distributed to the respective customers.

The ability of high-quality optical fiber to transmit large amounts of information without appreciable signal degradation is well known. As a result, optical fibers have found widespread use in many applications, such as voice and data transmission. Initially, optical fiber was often limited to such uses as trunk line communications or commercial settings requiring high rates of data throughput. More recently, however, the need for greater bandwidth in residential settings has brought optical fibers directly into homes and other premises.

Typically, information is fed from a central office of the data service provider using feeder cables made up of multiple optical fibers. For example, a typical feeder cable may have 12, 24, 36 or 48 individual optical fibers, each of which is capable of carrying a tremendous amount of information. While some customers may require all of the bandwidth provided by one of the optical fibers in the feeder cable, most subscribers (e.g., residential subscribers) do not. Instead, each of these feeder fibers may be distributed to a number of individual subscribers using an optical fiber splitter. It will be appreciated that the data service provider often needs to connect or disconnect service to customers in a given area. Specifically, all premises in the area equipped with optical fiber to the premises may not desire the data service at a certain point in time.

Most US-based passive optical network (PON) systems use a fiber distribution hub and a fiber distribution hub splitter. Although this technology generally meets service provider network requirements, the typical fiber distribution hub and fiber distribution hub splitters use proprietary splitters, a fixed internal cabling methodology and are difficult to service.

The present invention recognizes the foregoing considerations, and others, of the prior art.

SUMMARY OF THE INVENTION

According to one aspect, the present invention provides an exterior fiber distribution cabinet comprising an outer shell having at least one door for accessing an interior thereof. A module support frame is located inside the outer shell. At least one input distribution module, having a plurality of input distribution connector adapters, is attached to the module support frame. The cabinet further includes at least one optical splitter module attached to the support frame. The optical splitter module has a plurality of splitter connector adapters. Also provided is a connector holder support frame carrying a plurality of removable connector holders for maintaining a multiplicity of output connectors.

In exemplary embodiments, the module support frame may be configured to define a plurality of module attachment locations at which a respective input distribution module or optical splitter may be attached. For example, the module support frame may have a multiple of module attachment locations. Preferably, the module support frame may be pivotally mounted inside the outer shell such as about a vertical axis. In addition, the module support frame may further include a fiber guide structure defining a plurality of spaced apart slots for receipt of optical fibers passing therethrough. The input distribution connector adapters of the input distribution module(s) and the splitter connector adapters of the optical splitter(s) are preferably oriented toward the outside of cabinet to facilitate access thereto by a technician.

Preferably, the connector holder support frame may be pivotally mounted in the outer shell to move between a first position in which the connector holders are inaccessible and a second position in which the connector holders are accessible. Moreover, the connector holder support frame may have a panel defining a plurality of connector identification holes, each of which is in register with a respective connector tip location. In exemplary embodiments, the connector holder support frame may be pivotal about a horizontal axis such that the first position is a raised position and the second position is a lowered position.

The connector holders may be removably mounted to the connector holder support frame in parallel with each other. Each of the connector holders in such embodiments may be configured to maintain a plurality of output connectors such that connector tips thereof are located at respective connector tip locations. The connector holders may each have a plurality of ferrules for engagement by a corresponding one of the connector tips.

The exterior fiber distribution cabinet in accordance with this aspect of the invention may further have a plurality of cable spools at fixed locations inside the outer shell for storage of excess lengths of optical fiber. The cable spools may each have a semicylindrical structure.

In exemplary embodiments, the outer shell of the exterior fiber distribution cabinet may comprise first and second doors. The doors may be configured such that distal edges thereof form a corner of the outer shell when the first and second doors are in a closed position.

Embodiments are also contemplated in which a removable input bracket is mounted at a fixed location inside the outer shell such that removal of the input bracket permits an input feeder cable to remain connected while components of the cabinet are serviced. The outer shell of the exterior fiber distribution cabinet may be mounted on a riser skirt.

According to another aspect, the present invention provides an optical fiber connector storage arrangement comprising a connector holder support frame including a panel and a connector holder receiving structure. The panel defines a plurality of connector identification holes. Numbers or other indicia may be located adjacent to each of the holes to facilitate locating a corresponding stored connector. In addition, a plurality of removable connector holders are located in the connector holder receiving structure. The connector holders are adapted to maintain a plurality of optical fiber connectors such that connector tips thereof are located at respective connector tip locations. The connector tip locations are in register with a respective connector identification hole.

Preferably, each of the connector holders has a plurality of tip ferrules at respective connector tip locations. The connector holders in accordance with this aspect of the present invention are preferably light transmissive at the connector tip locations. For example, the connector holders may be formed of a transparent polymeric material.

In exemplary embodiments, the removable connector holders may be situated in parallel with each other in the connector holder receiving structure. For example, the connector holder receiving structure may have length greater than a width thereof. Preferably, the connector holders may each have at least one deflectable retention arm for engaging the connector holder receiving structure. For example, the connector holders may each have first and second deflectable retention arms.

A further aspect of the present invention provides an exterior fiber distribution cabinet comprising an outer shell having at least one door for accessing an interior thereof. A module support frame, located inside the outer shell, defines a plurality of module attachment locations. A connector holder support frame carries a plurality of removable connector holders for maintaining a multiplicity of output connectors.

An additional aspect of the present invention provides a method of attaching an output connector to an optical splitter in an exterior fiber distribution cabinet. One step of the method involves opening the exterior fiber distribution cabinet to reveal a connector holder support frame. The connector holder support frame is moved from a first position in which a plurality of connector holders carried by the connector holder support frame are inaccessible to a second position in which the connector holders are accessible. A selected one of the connector holders in which the desired output connector is maintained is removed from the connector holder support frame. The output connector is then removed from the selected connector holders and attached to a socket of the optical splitter.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
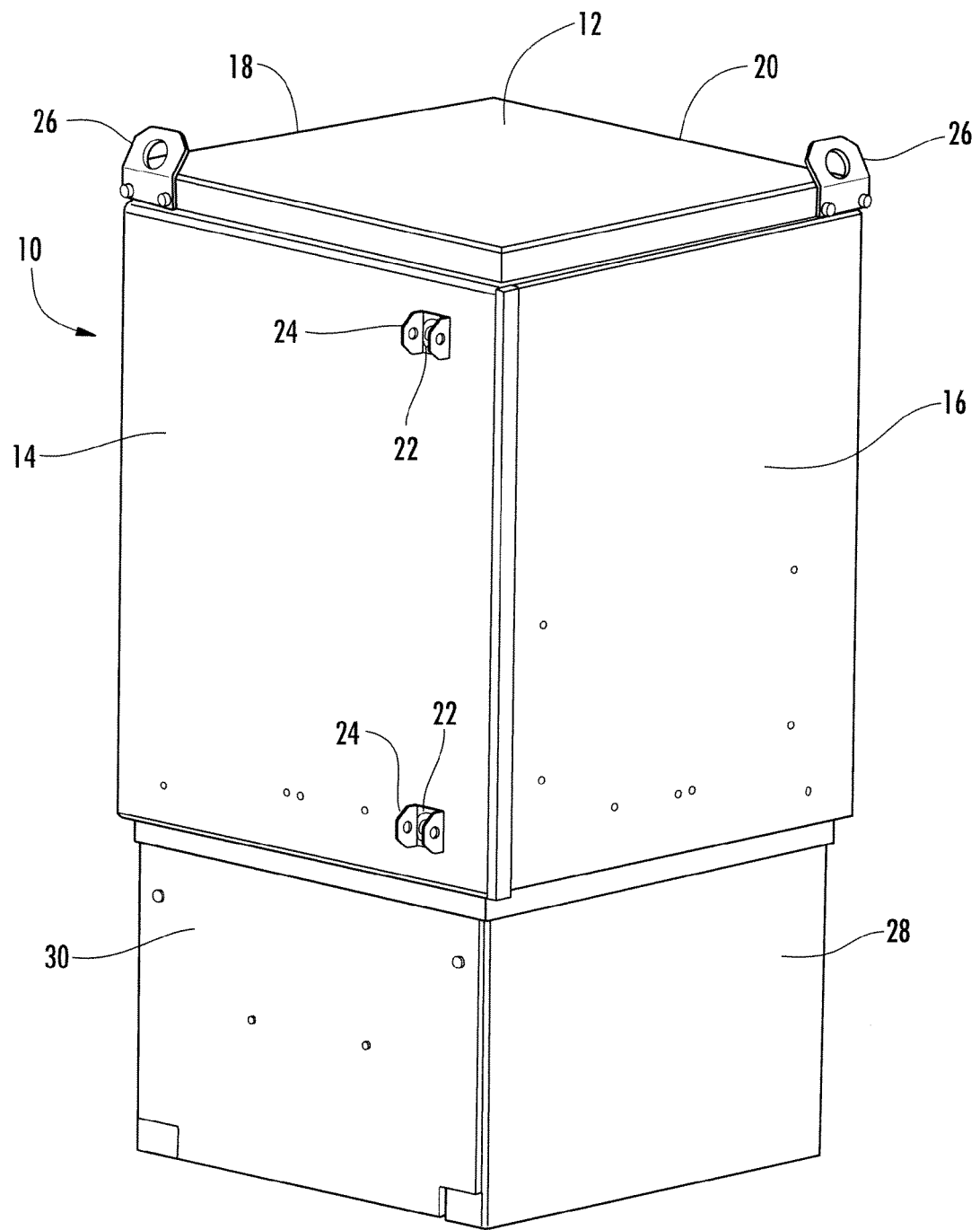
FIG. 1 is an isometric view of a distribution cabinet constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Embodiments of the present invention provide an optical fiber distribution cabinet for outdoor use that offer many advantages in comparison with the prior art. For example, preferred embodiments to be described in connection with the drawings are modular, easy to configure for different combinations of feeder fiber and distribution fiber counts, easy to connect service to customers, and easy to conduct extensive field repairs. In this regard, FIG. 1 illustrates an optical fiber distribution cabinet, 10, constructed in accordance with an embodiment of the present invention. As shown, cabinet 10 has a box-like outer shell having a top side 12, a first door 14 forming a front side, a second door 16 forming a right side, a left side 18 and a back side 20.

In this case, distal edges of doors 14 and 16 come together to form the right front corner of the outer shell when they are closed. As described in U.S. Pub. App. No. 2008/0042535A1 (incorporated fully herein for all purposes), such an arrangement provides greater access to the interior of the cabinet when the doors are opened. Preferably, doors 14 and 16 may be configured to interlock when closed such that door 14 must be opened before door 16. In this manner, latches 22 carried by door 14 can maintain both doors in the closed position. Although the latches generally require a special tool, additional security can be provided by fixed hasps 24 that block access to the latch when fitted with a padlock.

Typically, cabinet 10 will be either pole-mounted or mounted on the ground pad. To facilitate pole mounting, cabinet 10 is equipped in this embodiment with a pair of lifting eyes 26. If cabinet 10 is pad mounted, it is typically located atop a skirt such as skirt 28. As shown, skirt 28 has a hinged door 30 that desirably provides access to the region underneath cabinet 10.

Figure 2:
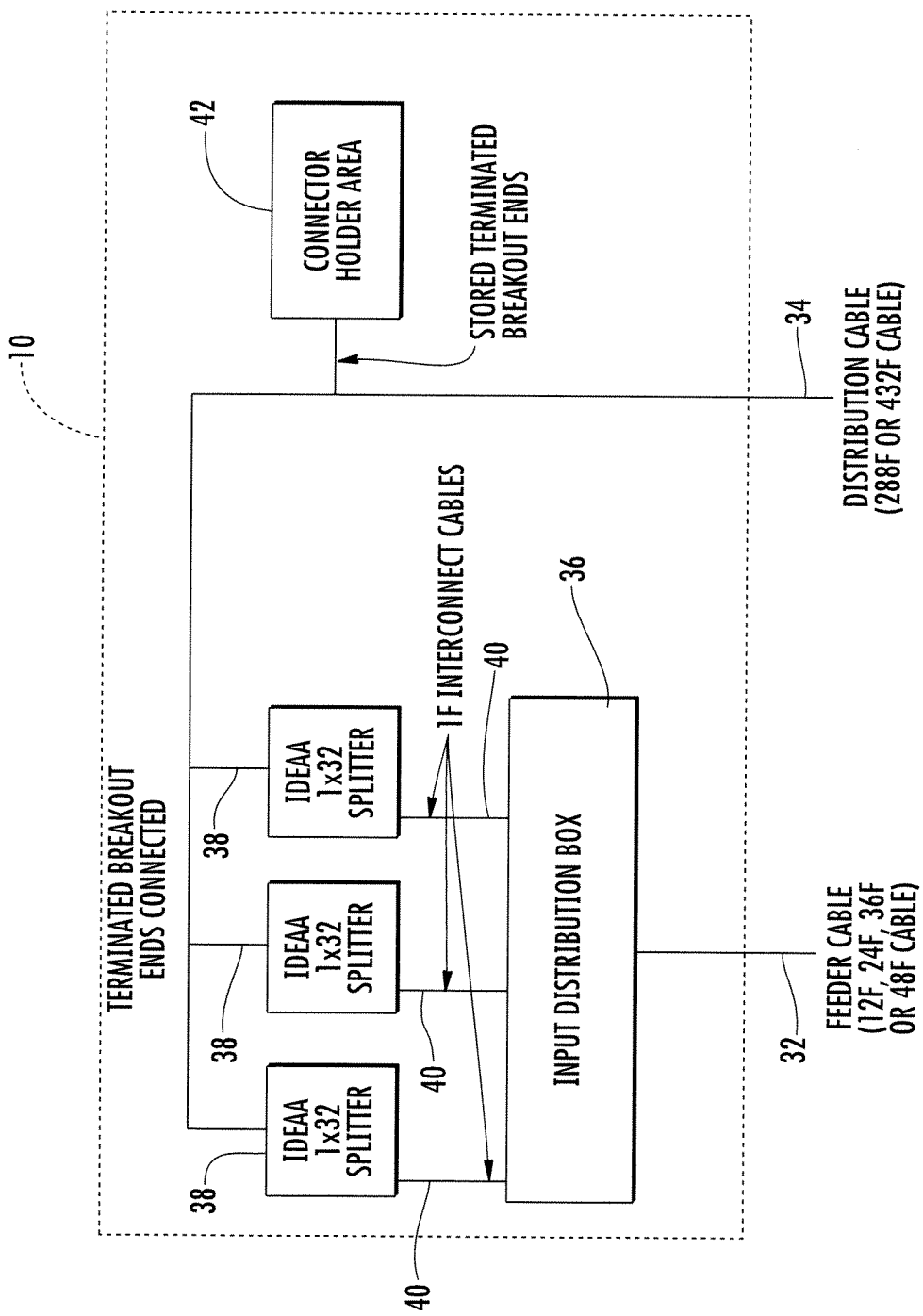
FIG. 2 is a diagrammatic view showing one preferred arrangement for wiring internal to the cabinet of FIG. 1.

Certain novel aspects of cabinet 10 are diagrammatically illustrated in FIG. 2. As will be explained, connections are made inside cabinet 10 between feeder cable 32 coming from the data service provider and distribution cable(s) 34 leading to customer premises. Feeder cable 32 will be made up of a number of individual optical fibers assembled in a bundle. For example, typical feeder cable may have twelve fibers (12F), twenty-four fibers (24F), thirty-six fibers (36F) or forty-eight fibers (48F). The distribution cable(s) 34 are also made up of a bundle of individual optical fibers but this number is typically much greater than that of feeder cable 32. For example, distribution cable 34 may typically have 288 fibers (288F) or 432 fibers (432F), often assembled in 12F subunits. Other distribution cable counts can also be used, such as 72F, 144F, 216F, and 360F. The individual distribution cable fibers lead directly to the premises to which the data service is provided. Thus, each feeder cable fiber corresponds to multiple distribution cable fibers (except in unusual circumstances where a subscriber has enormous bandwidth requirements).

In this regard, terminated ends of the individual fibers of feeder cable 32 are connected to an input distribution box 36. As will be explained in greater detail below, input distribution box 36 is formed as a module that can be easily inserted into or removed from a support frame within cabinet 10. For example, a typical input distribution box 36 may have the capacity to accommodate up to twelve (12) or up to twenty-four (24) feeder cable fibers. In such embodiments, two input distribution boxes are provided if the feeder cable has more than the number of individual fibers that can be accommodated by one input distribution box.

One or more optical splitters 38 are also located inside cabinet 10. Optical splitters 38 divide a single input fiber into a plurality of output fibers. For example, a typical optical splitter used in cabinet 10 may have a 1×32 configuration. One skilled in the art, however, will appreciate that other splitter configurations (such as 1×16, 1×8 or 1×4) may be utilized depending on the requirements of a particular installation. Preferably, splitters 38 are formed as modules that, like input distribution box 36, can be easily inserted into and removed from the support frame. Preferably, interconnection between fibers at input distribution box 36 and the respective inputs of splitters 38 is provided by respective one fiber (1F) jumper cables 40.

Splitters 38 are preferably configured to allow easy connection and disconnection to individual distribution fibers. In this regard, cabinet 10 defines a connector holder area 42 in which terminated ends of the distribution cable fibers are stored. As will be explained more fully below, the distribution cable ends are preferably formed as standard connectors which may be located and individually removed when needed from a connector holder. The selected connector is then simply plugged into an available receptacle on one of the splitters 38 when subscriber service is to be established. If subscriber service is to be disconnected, the technician unplugs the corresponding connector from the splitter receptacle and places it back into the connector holder.

Figure 3:
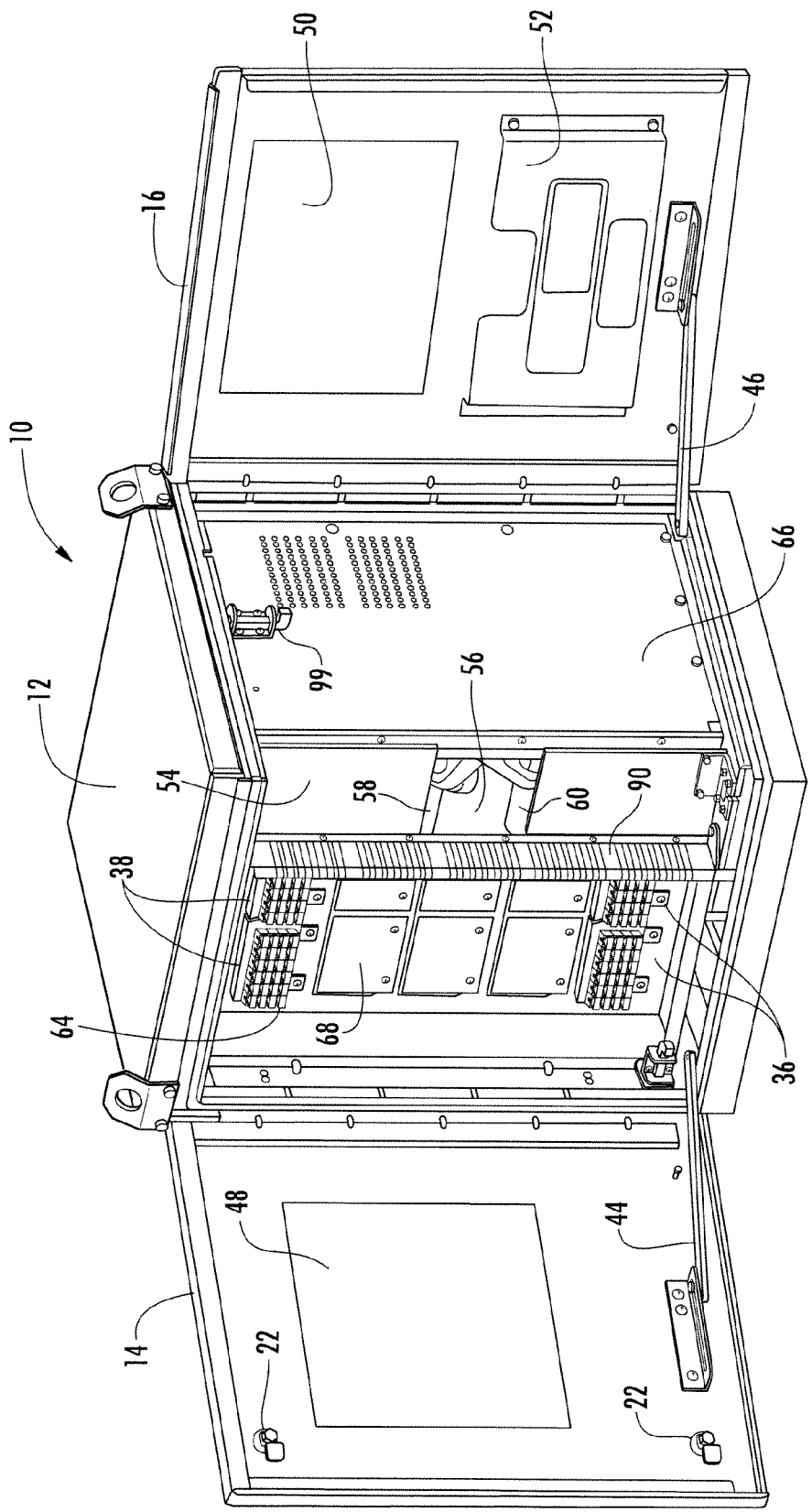
FIG. 3 is an isometric view similar to FIG. 1 but with outer doors open.

Referring now to FIG. 3, cabinet 10 is shown with doors 14 and 16 in open position. In this regard, doors 14 and 16 have hinges located at their respective proximal edges to pivot about a vertical axis. Linkages 44 and 46 may be provided to limit the extent to which respective doors 14 and 16 can open. The linkages may also provide a detent feature which tends to maintain the doors in the open position. As shown, the insides of doors 14 and 16 may be provided with labels 48 and 50 which may be used by the data service provider to identify the cables. A pocket 52 may be attached to the inside of one of the doors for storing technical manuals, test data and the like.

Figure 11:
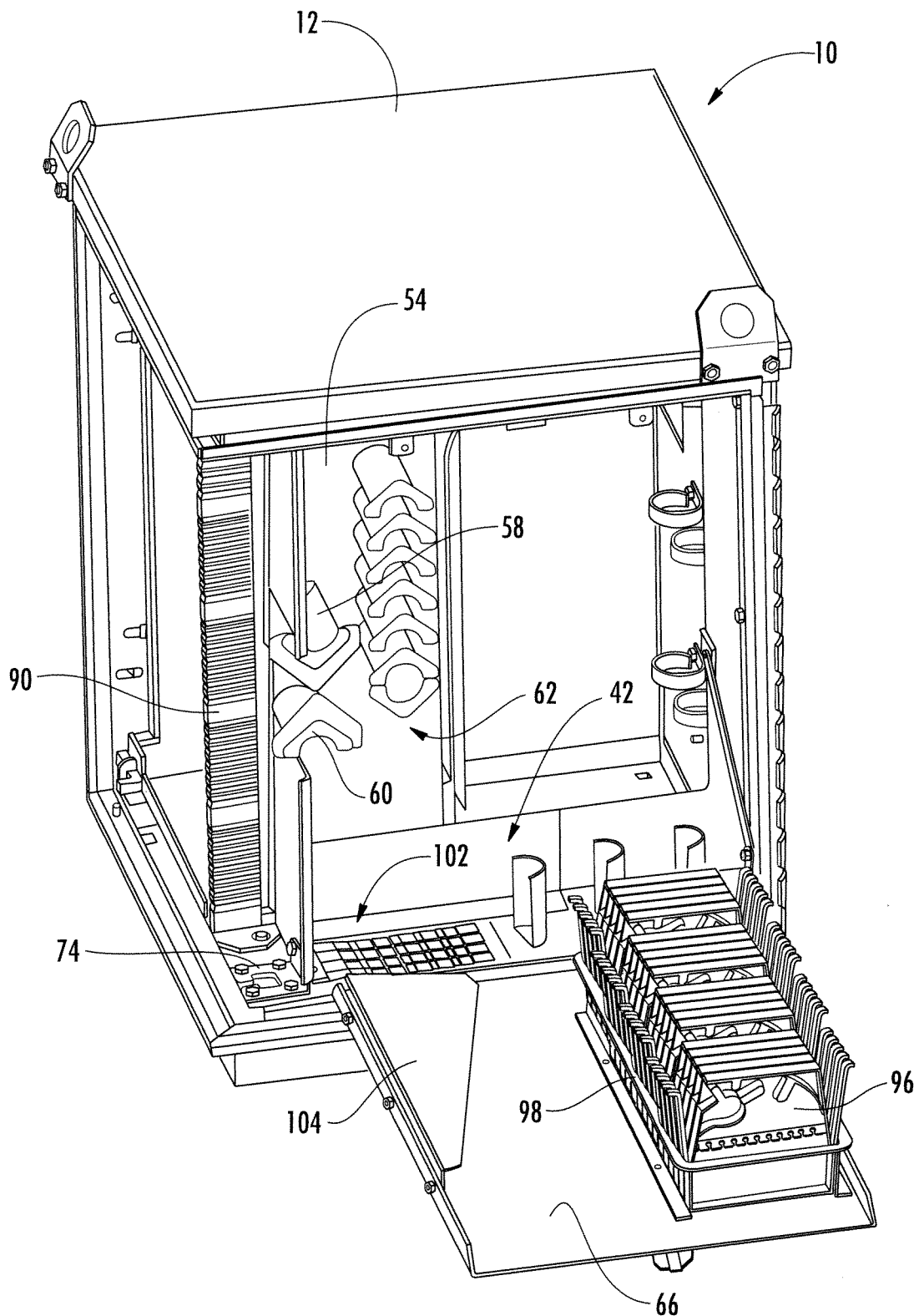
FIG. 11 is a side isometric view of the cabinet of FIG. 1 with outer doors removed for purposes of illustration and connector holder hinged frame in its lowered position.

A vertical structure 54 is located at a fixed position inside cabinet 10 adjacent the right front corner. Structure 54 defines an opening 56 through which distribution fibers can be passed for connection to a splitter. The upper and lower bounds of opening 56 are defined by semicylindrical guides 56 and 58 (FIG. 11) which limit the bending stresses on distribution cable fibers. Flanges are preferably located on the distal ends of the guides to maintain the fibers in position. In addition, as shown in FIG. 11, vertical structure 54 may also include a plurality of semicylindrical spools (collectively 62) about which excess length of cable can be wound as necessary or desired.

Referring again to FIG. 3, module support frame 64 is accessed behind door 14 whereas connector holder support frame 66 is accessed behind door 16. As shown, frame 64 has a predetermined number of locations (in this case, ten locations) at which any desired combination of input distribution boxes and optical splitters may be installed. In FIG. 3, for example, two input distribution boxes 36 are installed in the bottom two locations of frame 64. Similarly, two optical splitters 38 are installed in the top two locations of frame 64. Unused locations of frame 64 may be occupied by a "blank" (such as blank 68) until use of that location is needed.

Figure 4:
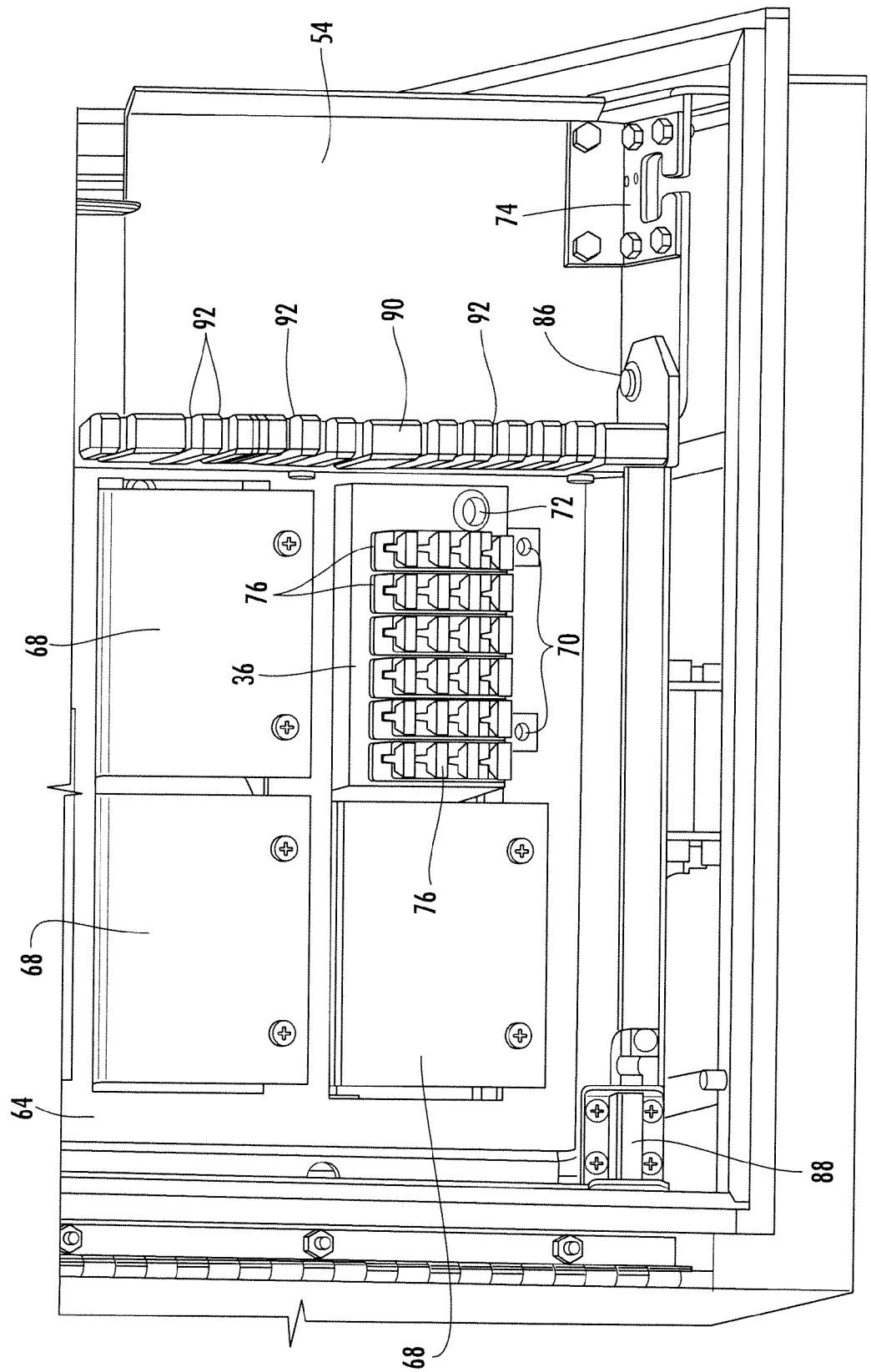
FIG. 4 is an enlarged view showing a bottom portion of the front of the open cabinet where an input distribution box is mounted.
Figure 5:
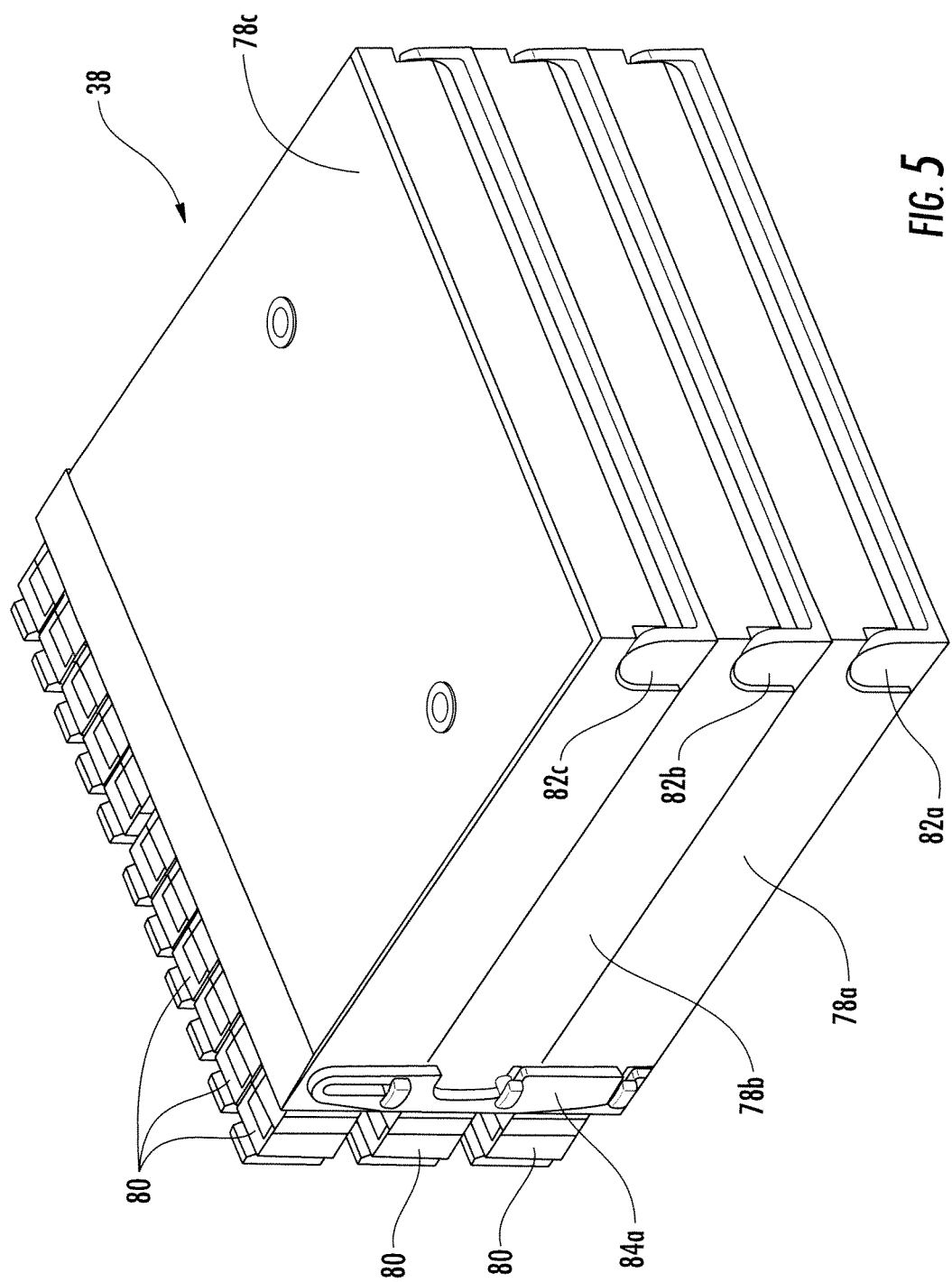
FIG. 5 is a rear isometric view of a preferred splitter module which may be utilized in the cabinet of FIG. 1.
Figure 6:
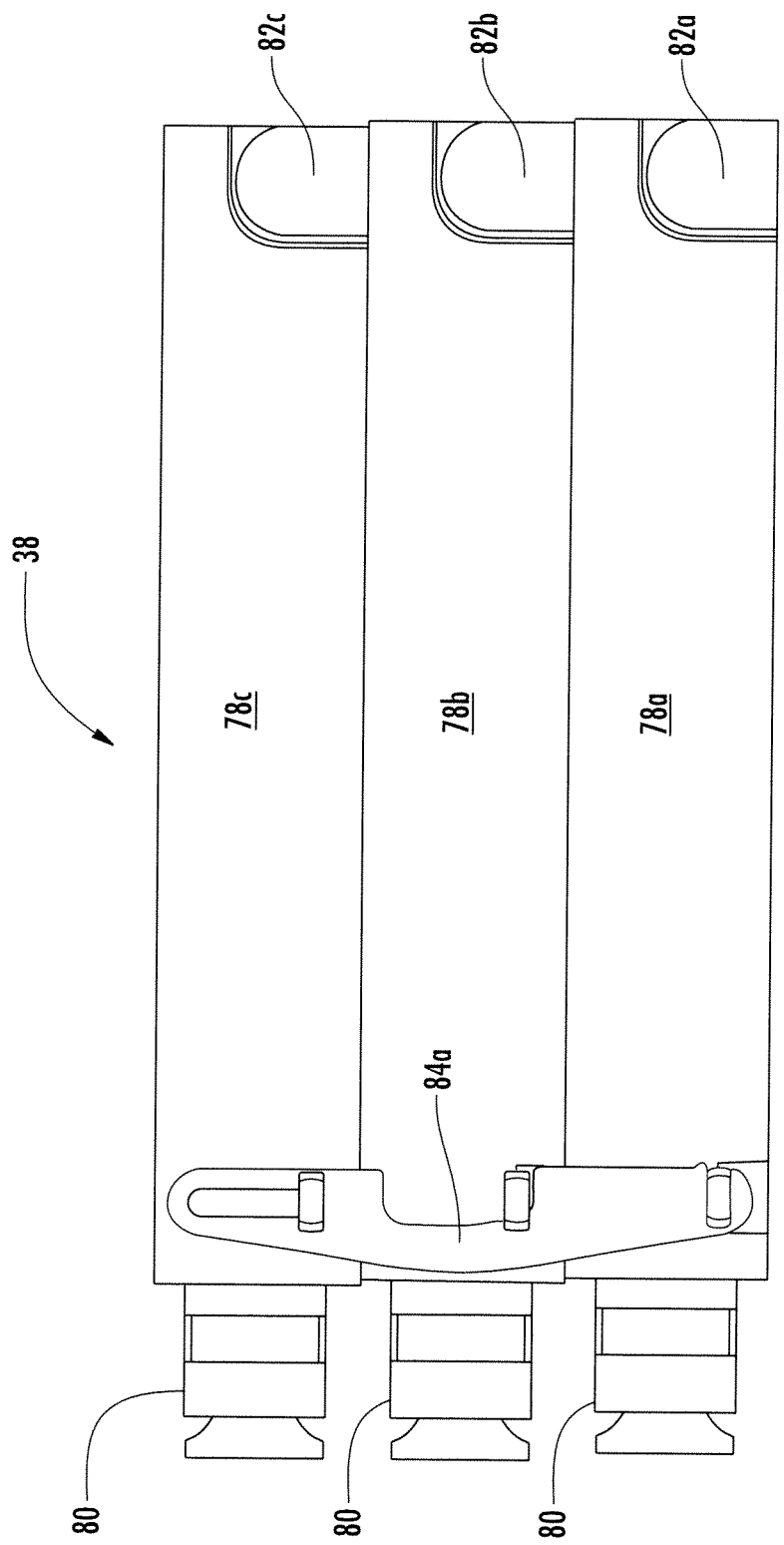
FIG. 6 is a side elevation view of the splitter module of FIG. 5.

Additional details of input distribution 36 will now be described with reference to FIG. 4. (In this case, a single input distribution box 36 is installed with the location to its left occupied by a blank 68.) As can be seen, input distribution box 36 is connected to support frame 64 in this case using a pair of attachment screws 70. One skilled in the art, however, will appreciate that any suitable technique for connecting input distribution box 36 can be used. An aperture 72 is defined in the front of input distribution box 36 for receipt of a feeder cable. The feeder cable is preferably routed from the bottom interior of cabinet 10 through a removable input bracket 74. Ends of the feeder cable fibers are terminated at respective receptacles 76 located on the front of input distribution box 36. Preferably, receptacles 76 may be standard receptacles such as SC connector receptacles. Receptacles 76 may be filled with a protective plug when not in use.

Referring now to FIGS. 5-8, an exemplary configuration of a splitter 38 is illustrated. As noted above, splitter 38 is preferably configured as a module that can be easily inserted into and removed from support frame 64. In this embodiment, splitter 38 is divided into three submodules 78a-c which each of which carries eleven receptacles 80 on its front surface. Submodules 78a-c are hinged together at respective hinges 82a-c as limited by laterally-mounted link plates 84a-b. Link plates 84a-b allow some separation of submodules 78a-c to facilitate making connections at receptacles 80. Receptacles 80 may be filled with a protective plug when not in use.

Figure 7:
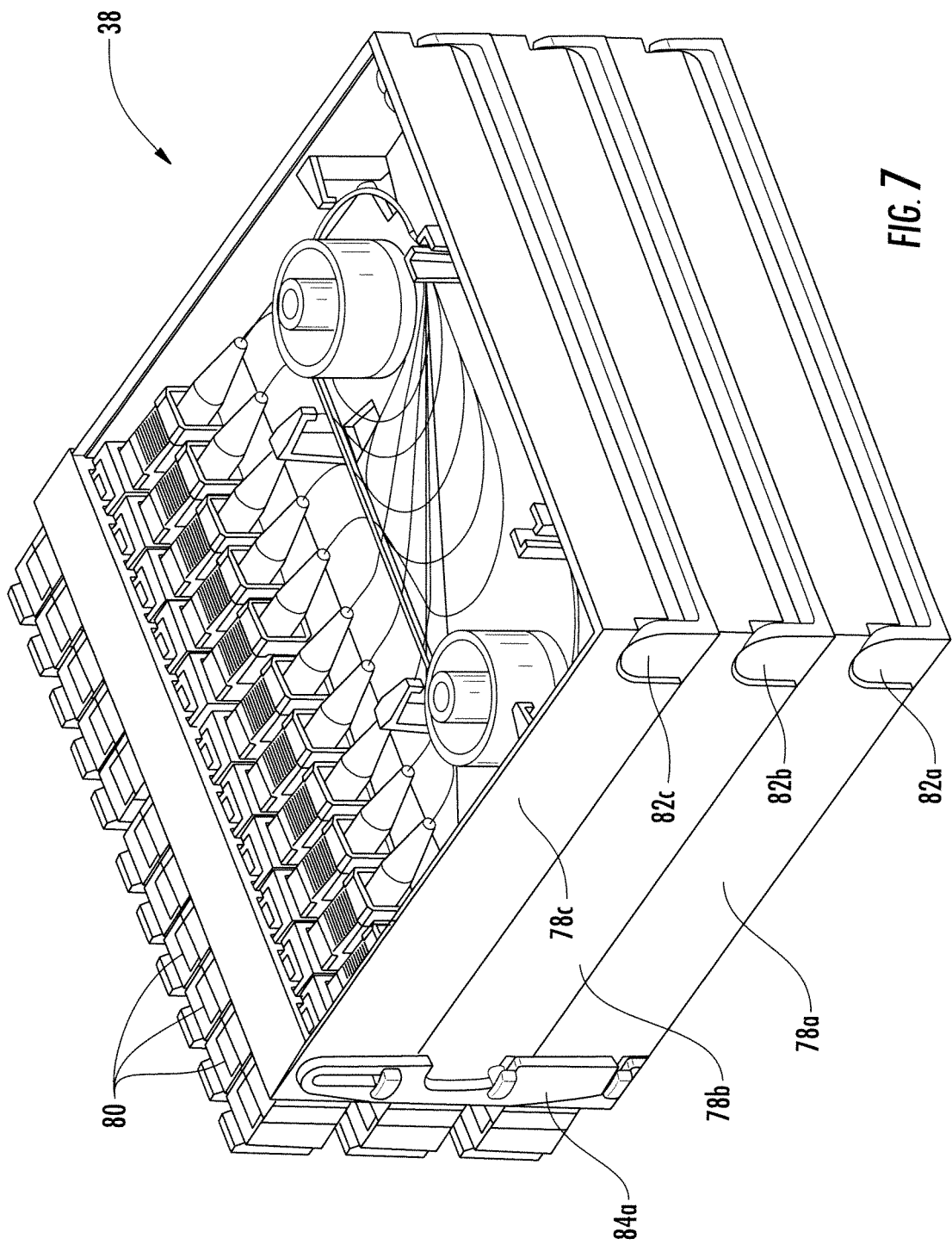
FIG. 7 is an isometric view similar to FIG. 5 but with the top lid of the splitter module removed to reveal various internal components.
Figure 8:
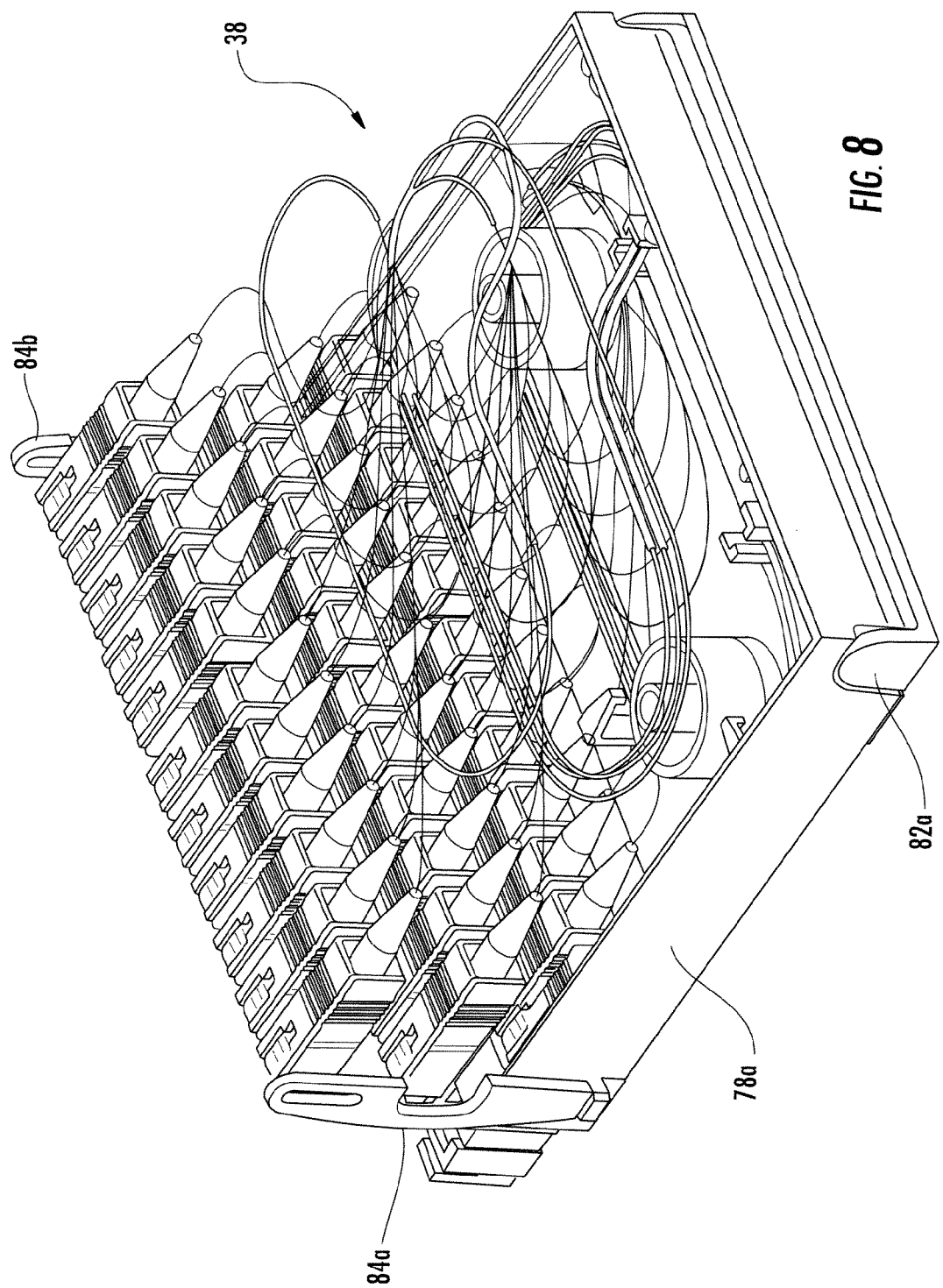
FIG. 8 is an isometric view similar to FIG. 5 but with portions of the case not shown to reveal various internal components.

Details of the internal construction of splitter 38 are described in PCT application no. PCT/US2011/022594, incorporated fully herein by reference for all purposes. FIGS. 7 and 8, however, show splitter 38 with portions of the housing removed or broken away so that various internal structures can be seen. In this embodiment, one of the receptacles 80 serves as an input from input distribution box 36. This single input line is split inside of splitter 36 into thirty-two outputs corresponding to the remaining receptacles 80. The frontal location of receptacles 76 and the input receptacle of receptacles 80 allows the interconnection therebetween to be accomplished by a common one fiber (1F) jumper cable.

Figure 17:
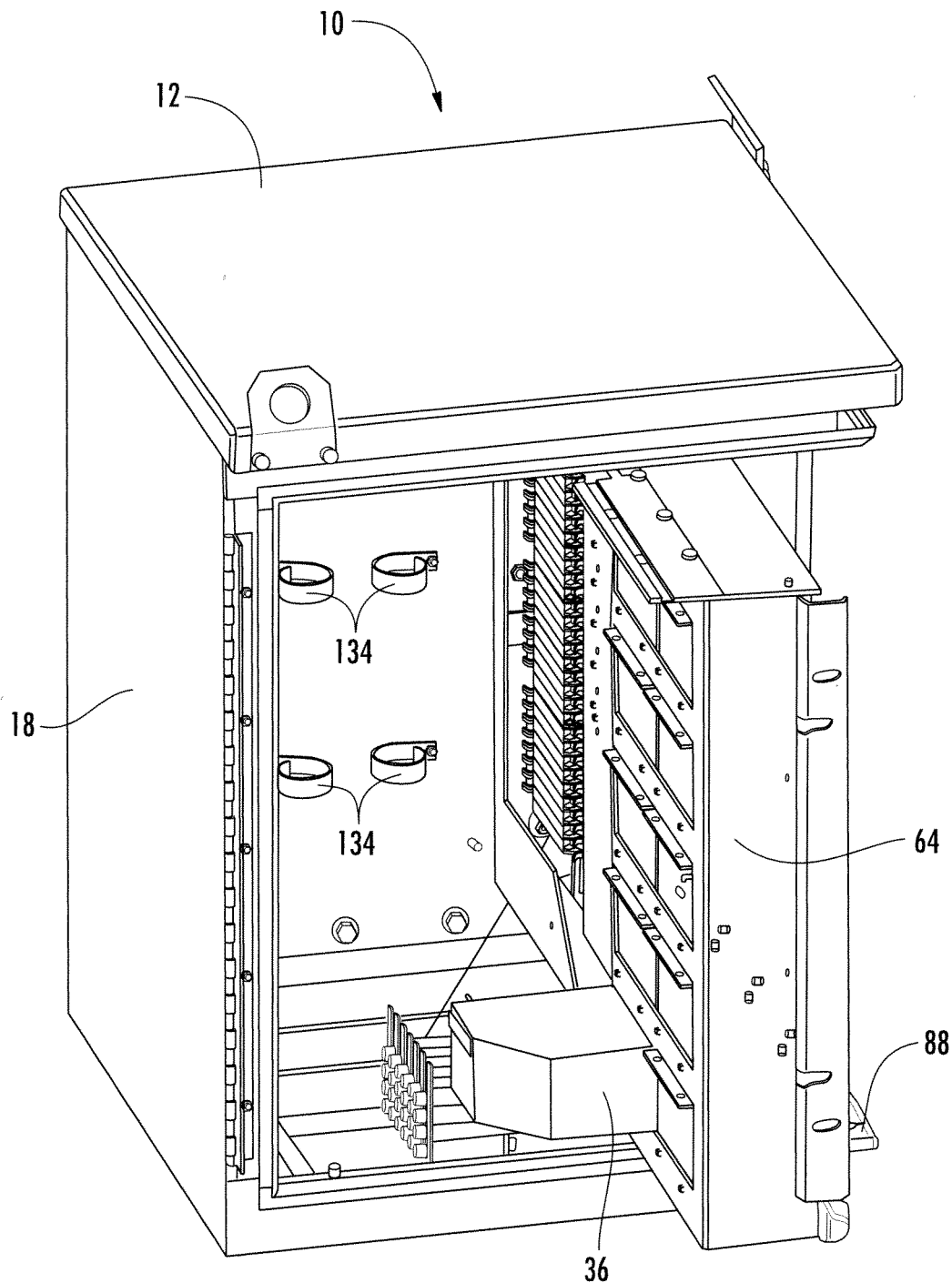
FIG. 17 is a front isometric view of the cabinet of FIG. 1 with outer doors removed for purposes of illustration but with the swinging module support frame in its open position.

Referring again to FIG. 4, support frame 64 is mounted within cabinet 10 to pivot about a vertical axis. In this case, for example, a lower pivot pin 86 and a corresponding upper pivot pin are provided at structure 54 for this purpose. A latch 88 (here in form of a deadbolt latch) is provided to maintain support frame 64 in the closed position (shown in FIG. 4). When access to the area behind support frame 64 is desired, the technician releases latch 88 and pivots support frame 64 toward the outside of cabinet 10 (as shown in FIG. 17).

Figure 22:
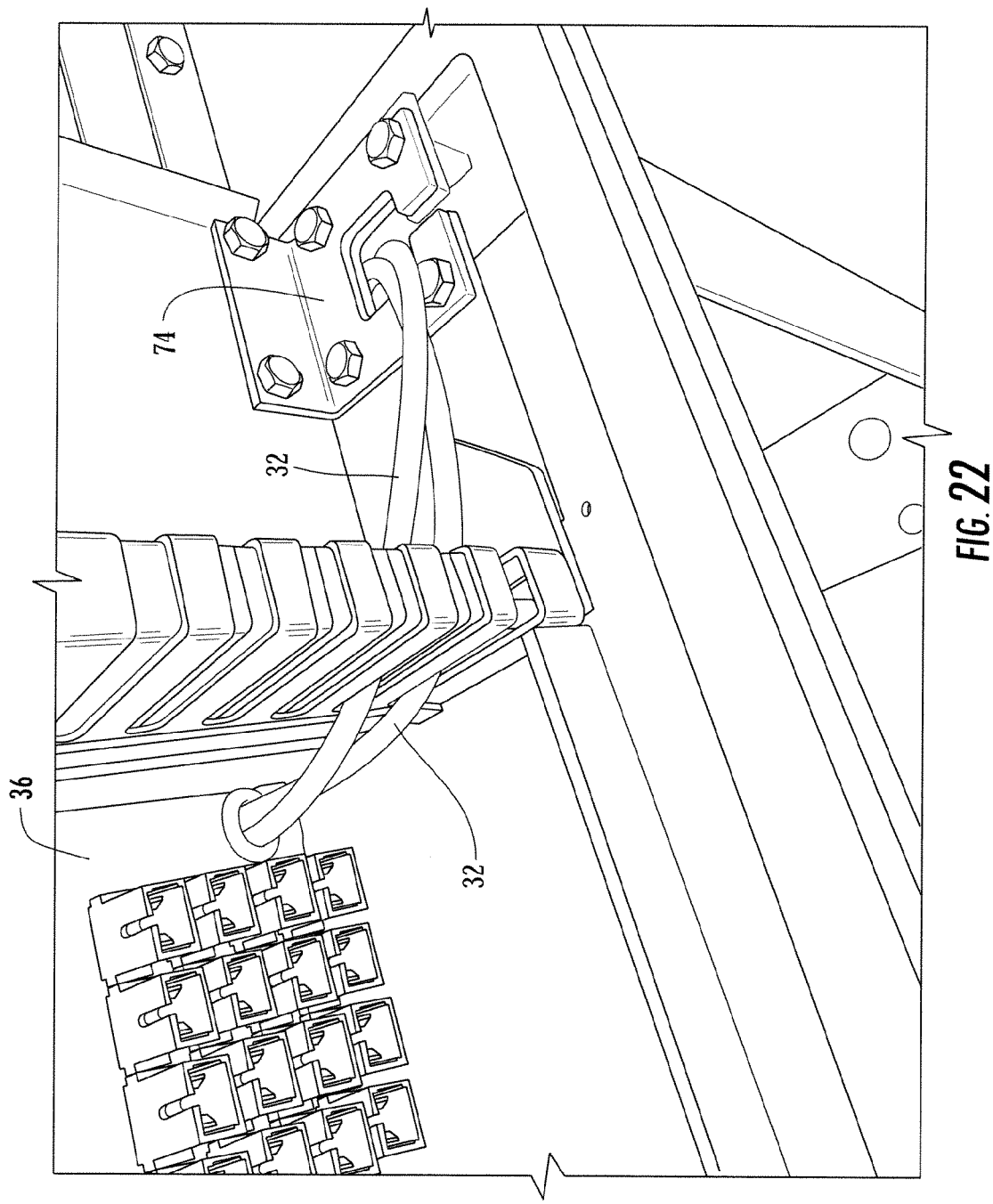
FIG. 22 is an enlarged front view of a bottom portion of the open cabinet showing the removable input bracket.

In the illustrated embodiment, support frame 64 further includes a vertical fiber guide 90. Fiber guide 90 defines a plurality of spaced apart slots 92 for receipt of optical fibers therethrough. These may include individual distribution fibers brought over from the connector holder area 42 or feeder cables 32 (FIG. 22). Preferably, a compressible material such as foam is located in slots 92 to hold the fibers in position.

Figure 9:
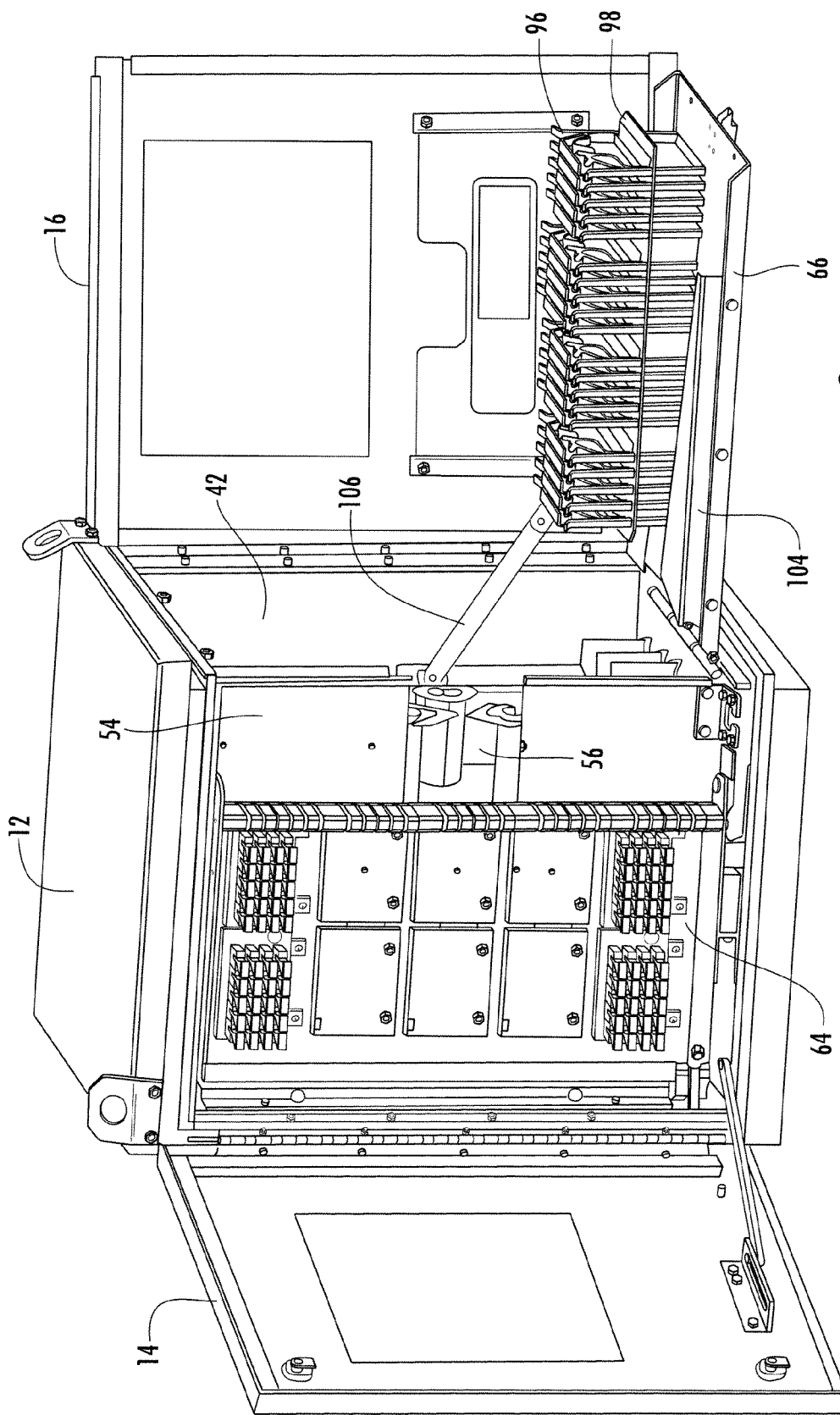
FIG. 9 is an isometric view similar to FIG. 1 but with outer doors open and connector holder hinged frame in its lowered position.
Figure 10:
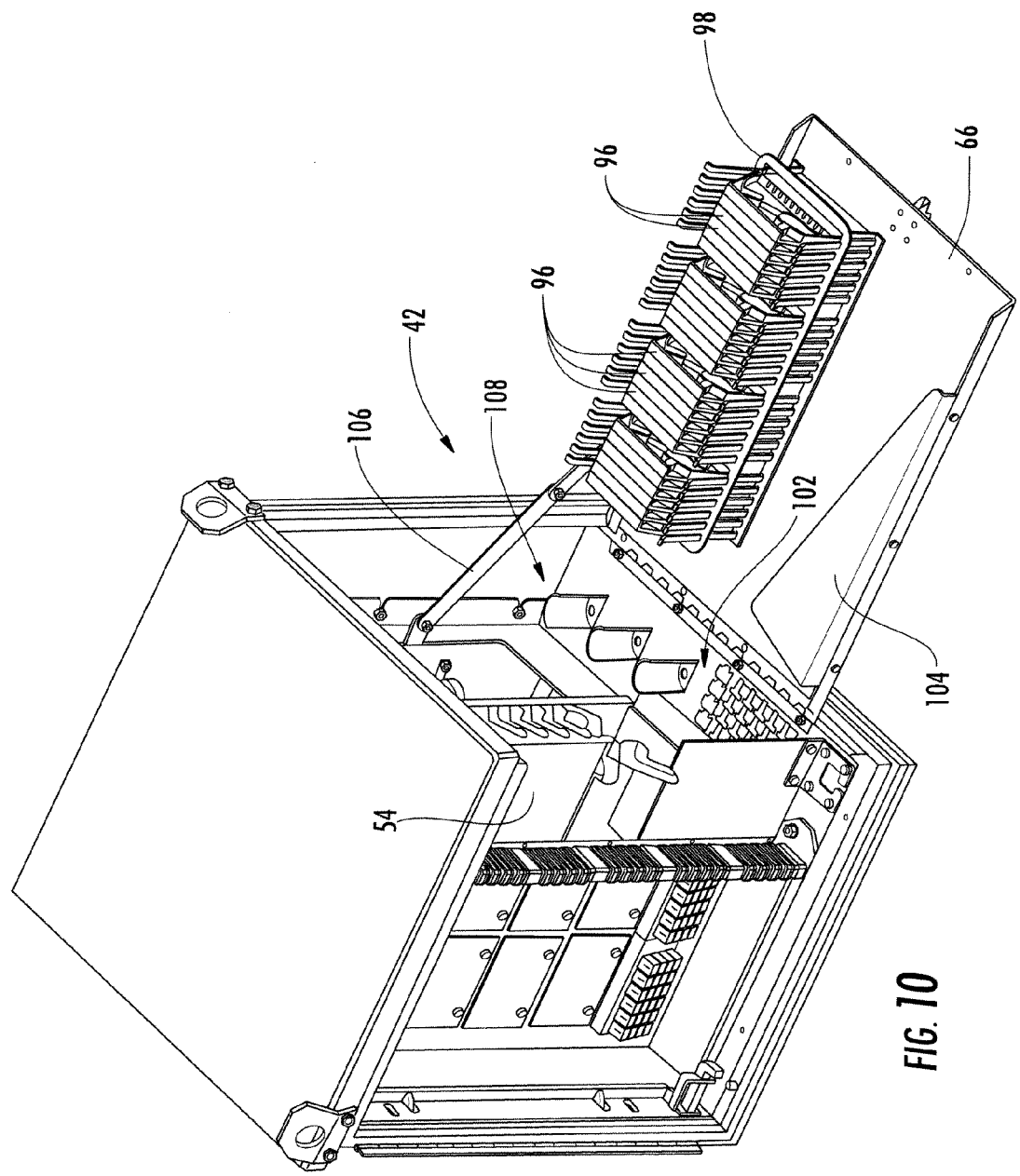
FIG. 10 is an overhead isometric view of the cabinet of FIG. 1 but with outer doors removed for purposes of illustration and connector holder hinged frame in its lowered position.

Connector holder support frame 66 is pivotal about a horizontal axis so that it can be lowered from the first position shown in FIG. 3 to a second position shown in FIGS. 9-11. In the first position, connector holder support frame is maintained by a suitable latch, such as latch 94. In this case, latch 94 is configured as a deadbolt latch similar to latch 88. When in the lowered position, the technician may access the plurality of connector holders 96 located in a connector holder receiving structure 98. As shown, the connector holders are arranged as parallel cartridges in the receiving structure 98.

Each of connector holders 96 is adapted to maintain a plurality of distribution fiber connectors (e.g., twelve connectors) which may be connected to a receptacle of a splitter 38 (or in the case of a subscriber having enormous bandwidth requirements, directly to a receptacle of input distribution box 36). To do this, a technician would remove the particular connector holder 96 having the specific connector for a subscriber's distribution fiber. That connector is then pulled around to the front of the open cabinet and plugged into one of the receptacles at module support frame 64. The fiber is held steady by the compressible material in a slot 92 of fiber guide 90. Any excess length of fiber may be taken up on spools 62. Connector holder support frame is then raised and latched, after which doors 14 and 16 can be closed.

Figure 12:
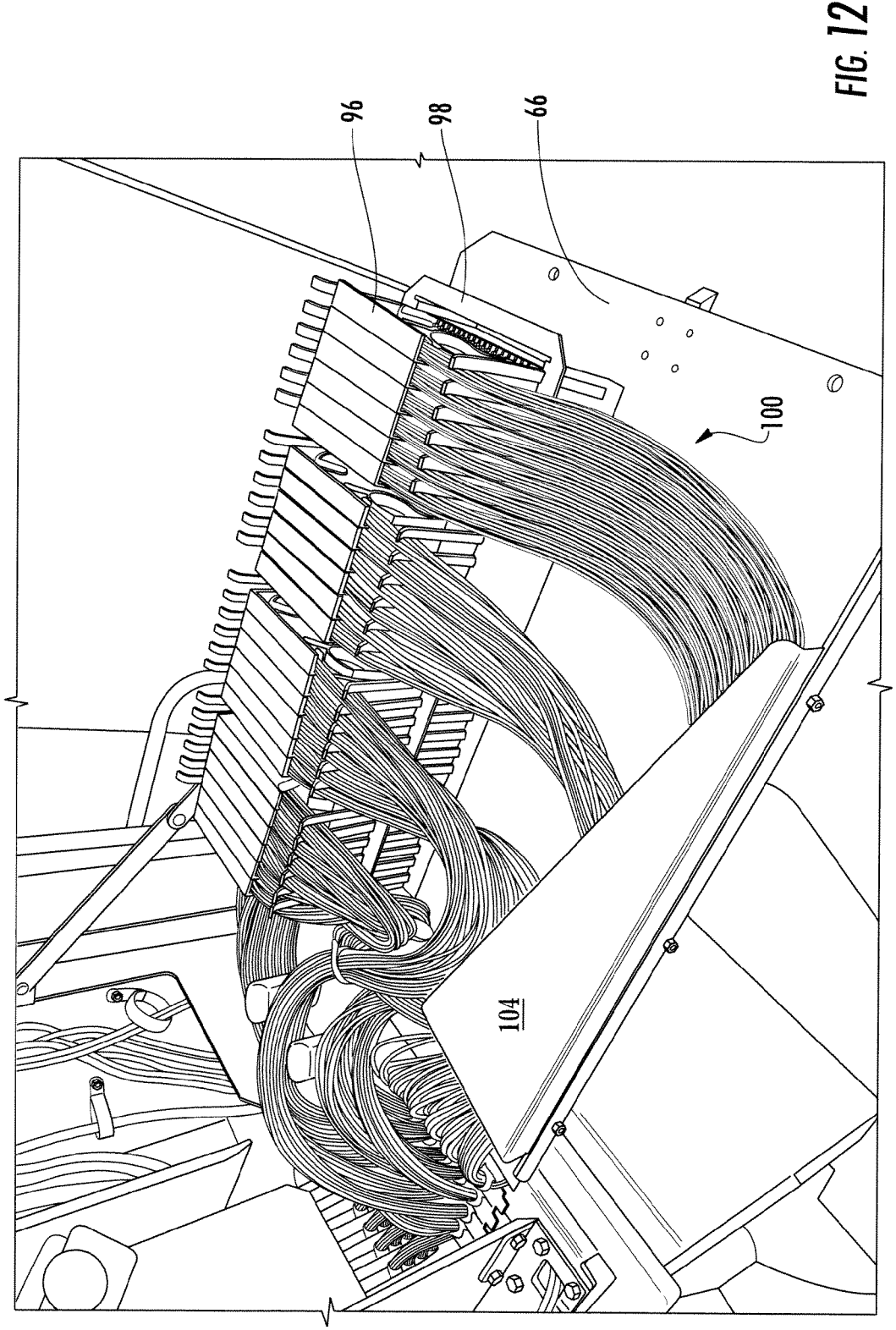
FIG. 12 is an enlarged view of the connector holder hinged frame in lowered position showing a multiplicity of optical fibers extending to the connector holders.

As can be seen with reference to FIGS. 11 and 12, the distribution fibers 100 are routed from the inside of cabinet 10 into the connector holder area 42 through an arrangement of grommet holes collectively indicated at 102. A guard 104 may be provided on the inside of connector holder support frame 66 to prevent distribution fibers 100 from interfering with closure of connector holder support frame 66 (which could damage the distribution fibers). A suitable linkage 106 (FIG. 10) is preferably provided to limit the downward movement of connector holder support frame 66 to a position approximately parallel with the ground. As most easily seen in FIG. 10, connector holder area 42 may include several additional semicylindrical spools (collectively indicated at 108) where excess length of distribution fiber may be taken up. For example, distribution fiber for connectors located in connector holders closer to the pivot axis can be taken up on spools 108.

Figure 13:
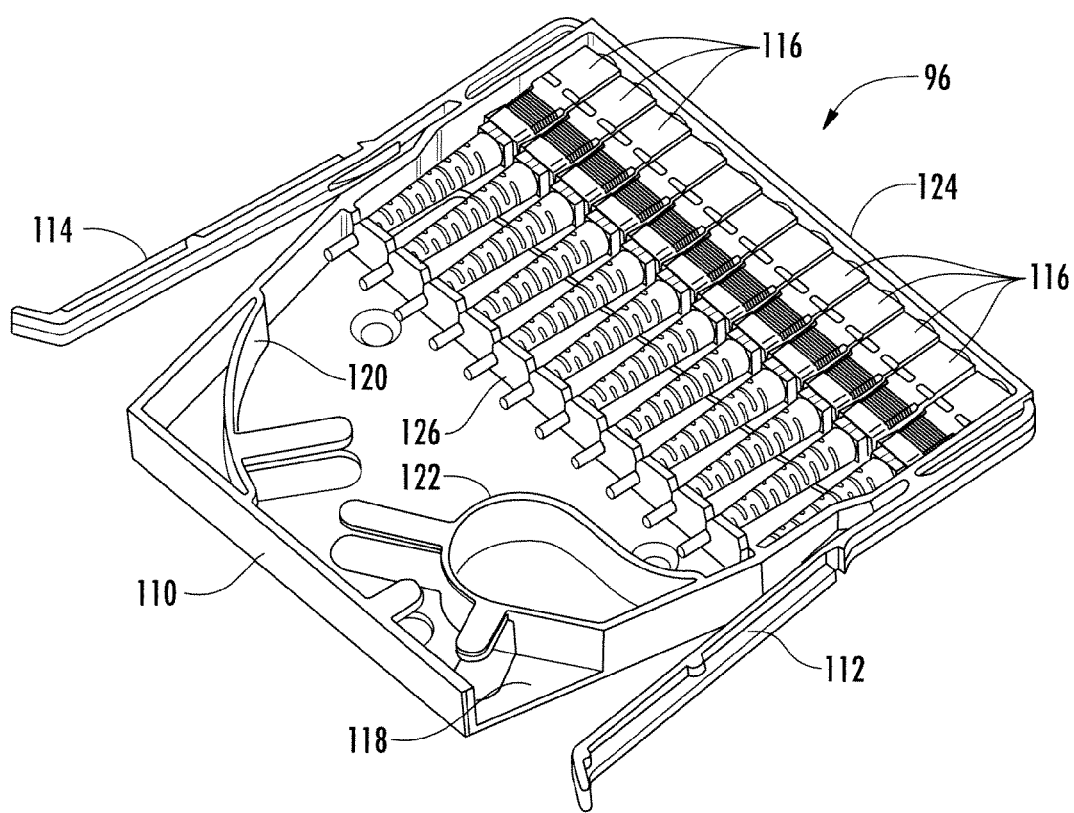
FIG. 13 is an overhead rear view of an exemplary connector holder showing a plurality of optical fiber connectors being stored therein.
Figure 14:
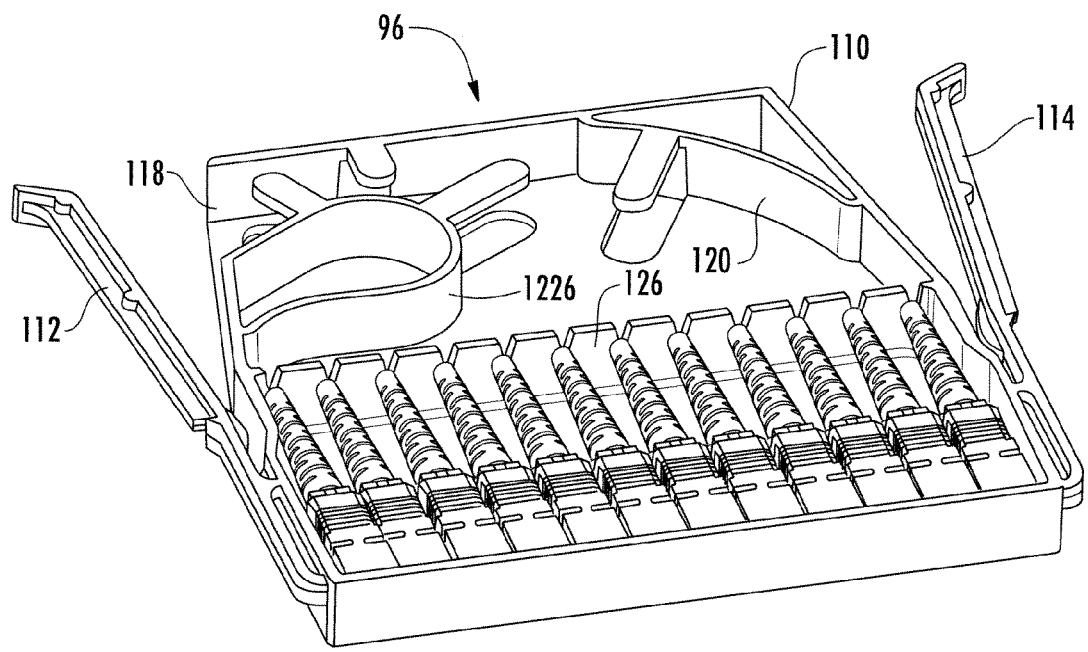
FIG. 14 is an overhead front view of the connector holder of FIG. 13.
Figure 15:
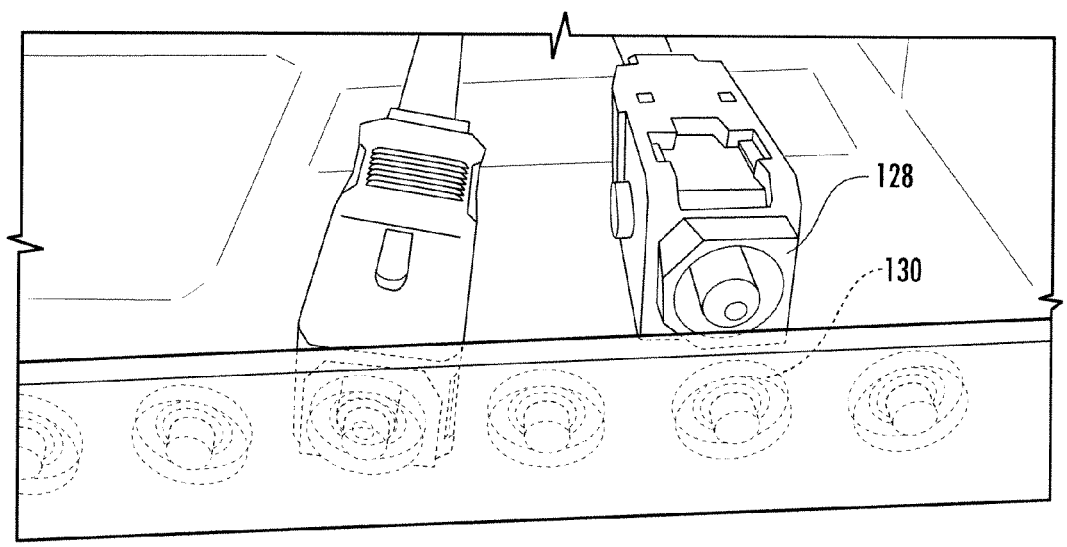
FIG. 15 is an enlarged view of a portion of a connector holder showing the manner in which optical fiber connectors are stored therein using a connector ferrule.

An exemplary configuration for each of the connector holders 96 is shown in FIGS. 13-15. Preferably, connector holders 96 may be a unitary body 110 formed of a suitable polymeric material. In this case, a pair of retention arms, 112 and 114, extend away from the remainder of body 110. Retention arms 112 and 114 may be pushed in by the technician in order to remove connector holder 96 from the receiving structure 98. When arms 112 and 114 are released, they will move back to their original positions to retain connector holder 96 in the receiving structure 98.

The individual distribution fibers are terminated in respective connectors 116, such as SCAPC connectors, and exit from body 110 through a gap 118. Body 110 may include suitable bend limiters 120 and 122 to limit the extent to which distribution fibers can be bent. Connectors 116 are preferably situated side by side such that their tips are located on the inside of a transmission surface 124. Preferably, body 110 may be formed of a light transmissive material, in which case transmission surface 124 may be of the same material as the reminder of body 110. If body 110 is otherwise opaque, however, transmission surface 124 may be provided by a transparent window fitted into a corresponding opening in body 110. The distribution fibers are gripped at a location behind the boot of each connector 116 in corresponding holes defined by a cross support 126. (It will be appreciated that the length of fiber behind connectors 116 is removed in FIGS. 13 and 14 for purposes of illustration.)

Referring now specifically to FIG. 15, the tip 128 of each connector 116 is spring-loaded so that it may be retained by a corresponding ferrule 130. This eliminates the need to use a dust cap to cover an unused connector. In addition, the specific positions that can be occupied by connector 116 when connector holders 96 are installed in receiving structure 98 are known. This property can be used in advantageous fashion to assist the technician in locating the desired connector.

Figure 16:
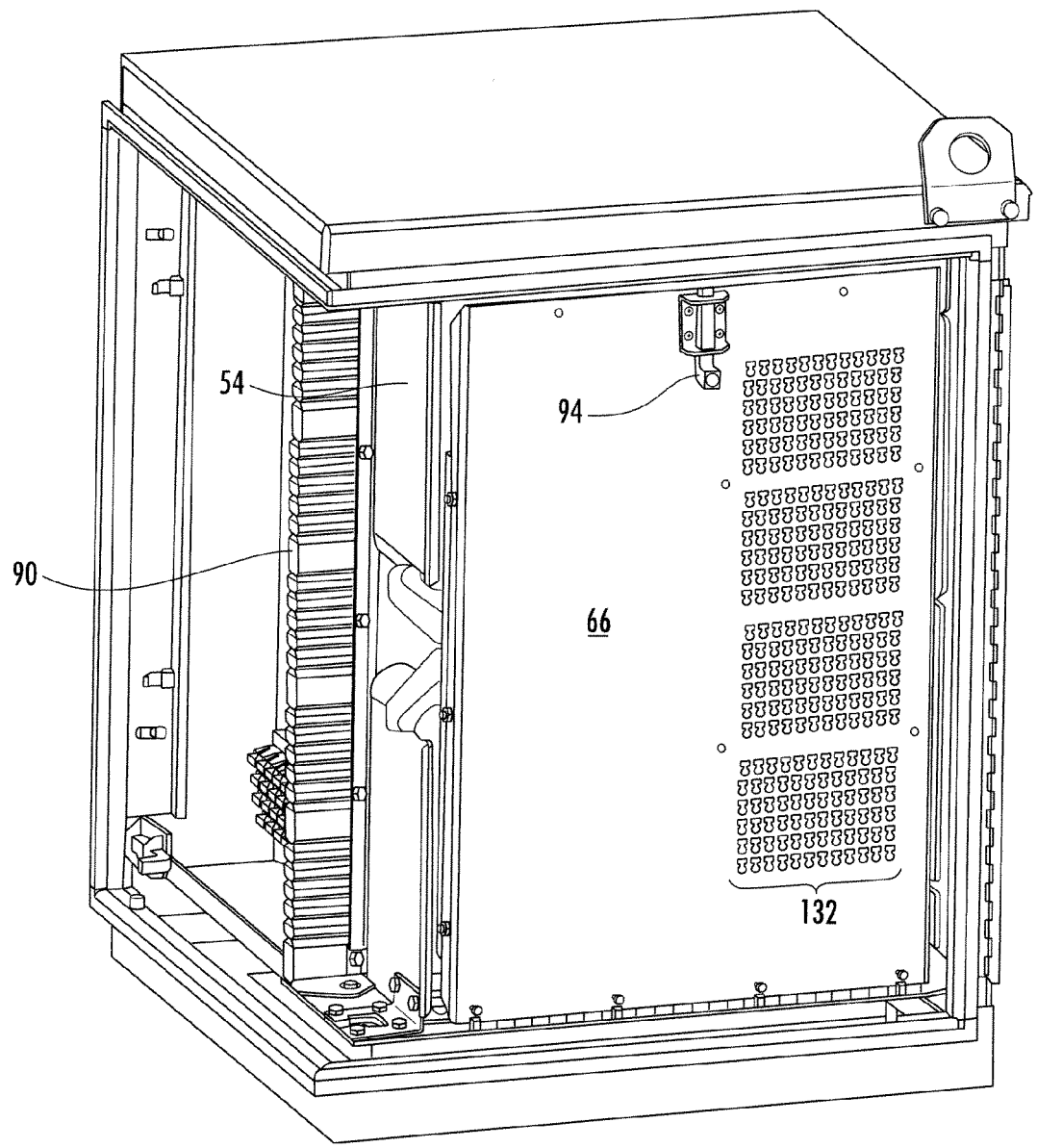
FIG. 16 is a view similar to FIG. 11 but with the connector holder hinged frame in a raised and latched position to show the plurality of connector identification holes corresponding to respective optical distribution fibers stored in the connector holders.

In particular, as shown in FIG. 16, connector holder support frame 66 defines a plurality of connector identification holes collectively indicated at 132. Connector identification holes 132 are respectively aligned with each of the ferrule locations defined by connector holders 96 when they are installed in the receiving structure 98. Preferably, alphanumeric indicia (such as a simple number) may be provided adjacent to each of the identification holes 132. This allows a field technician to conduct a simple "red-light" check to verify continuity and to visually inspect the connector tip. For example, one technician at the subscriber's premises may inject a visible light into the distal end of the distribution fiber, which will be received at cabinet 10 if there is suitable continuity. The technician at cabinet 10 can easily locate the correct connector depending on which identification hole is lit.

Figure 18:
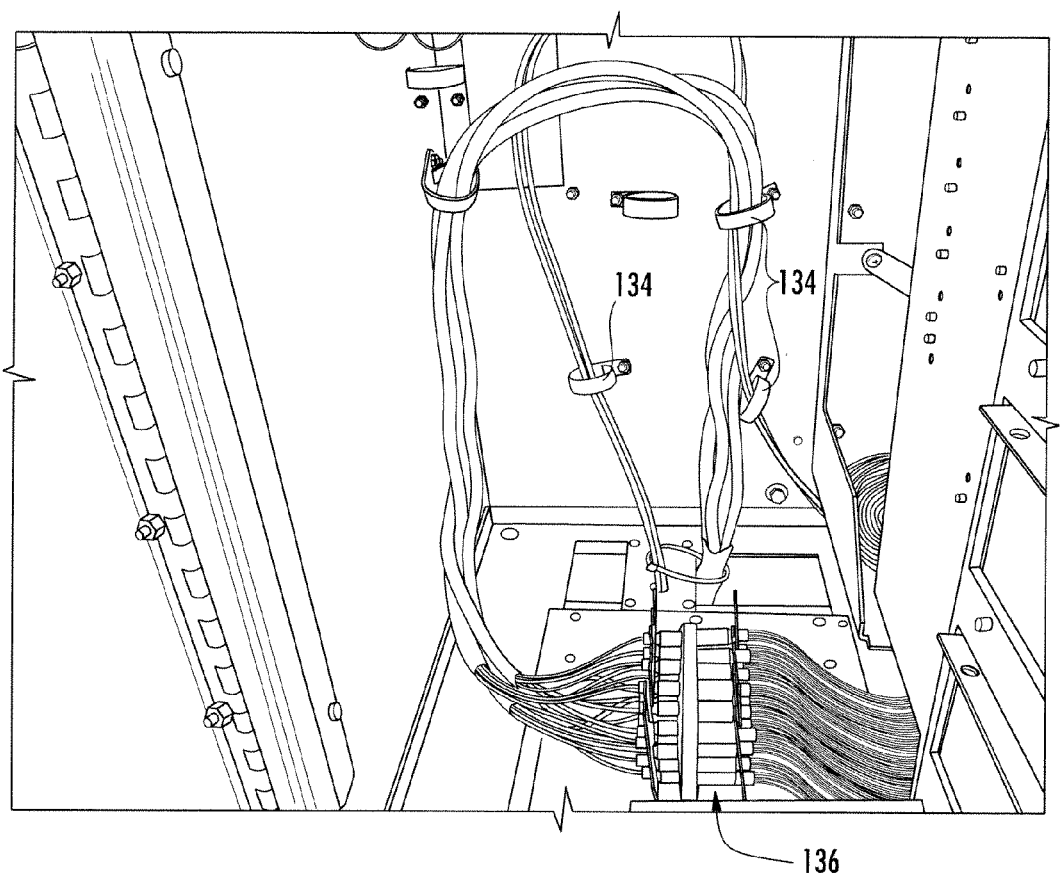
FIG. 18 is an enlarged view showing the cabinet interior as revealed when the swinging module support frame is in the open position as in FIG. 17, further showing optical fiber cables located therein.
Figure 19:
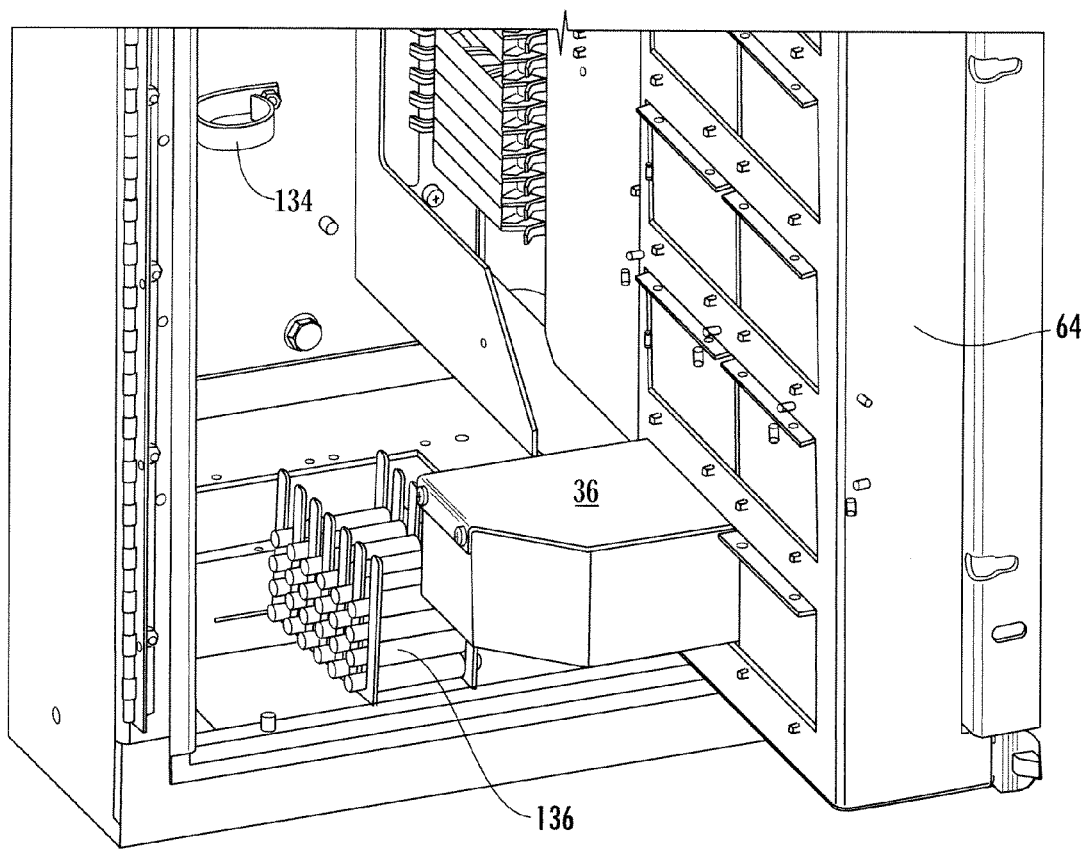
FIG. 19 is an additional enlarged view showing the cabinet interior as revealed when the swinging module support frame is in the open position as in FIG. 17.
Figure 20:
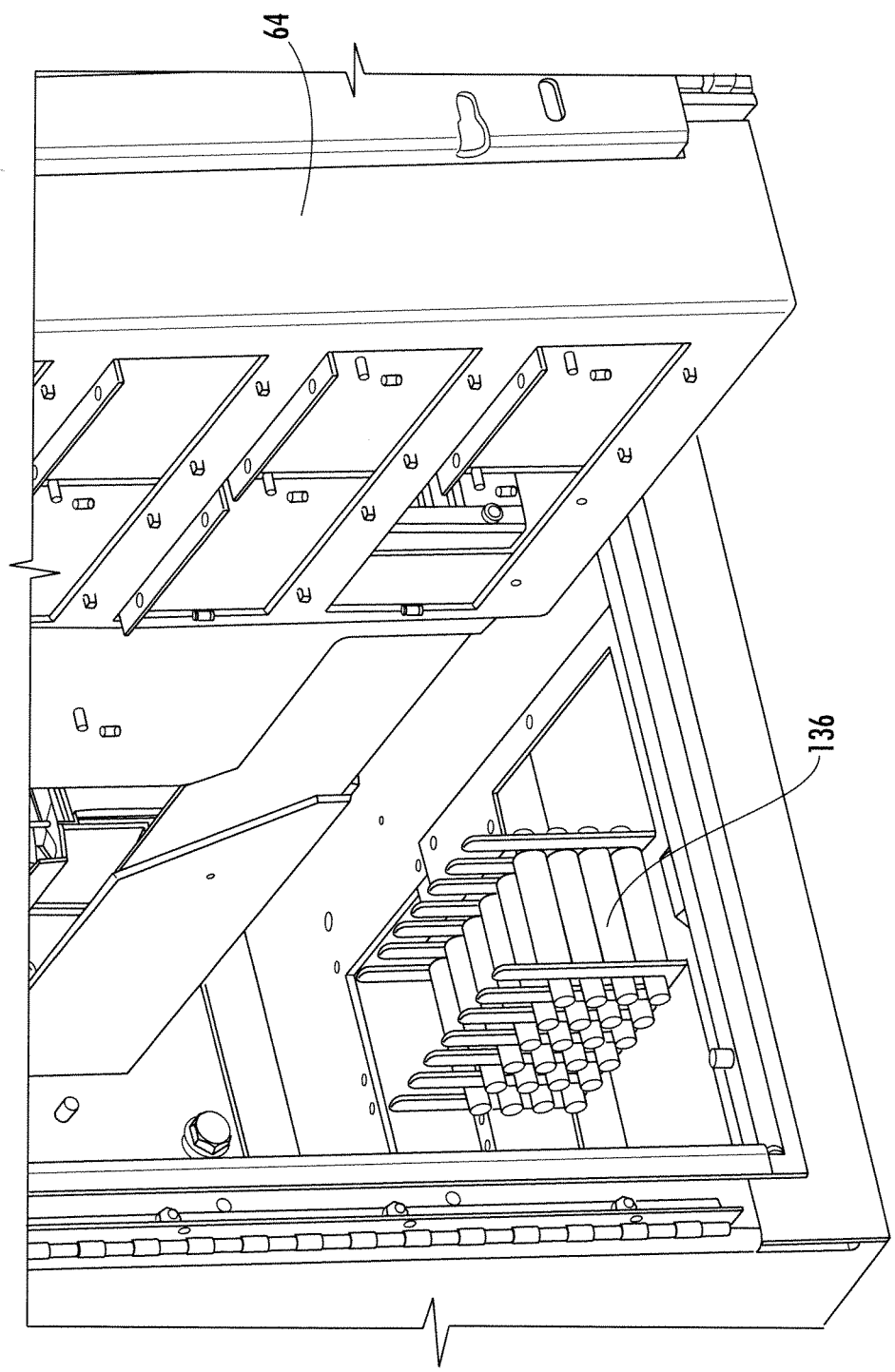
FIG. 20 is an additional enlarged view showing the cabinet interior as revealed when the swinging module support frame is in the open position as in FIG. 17.
Figure 21:
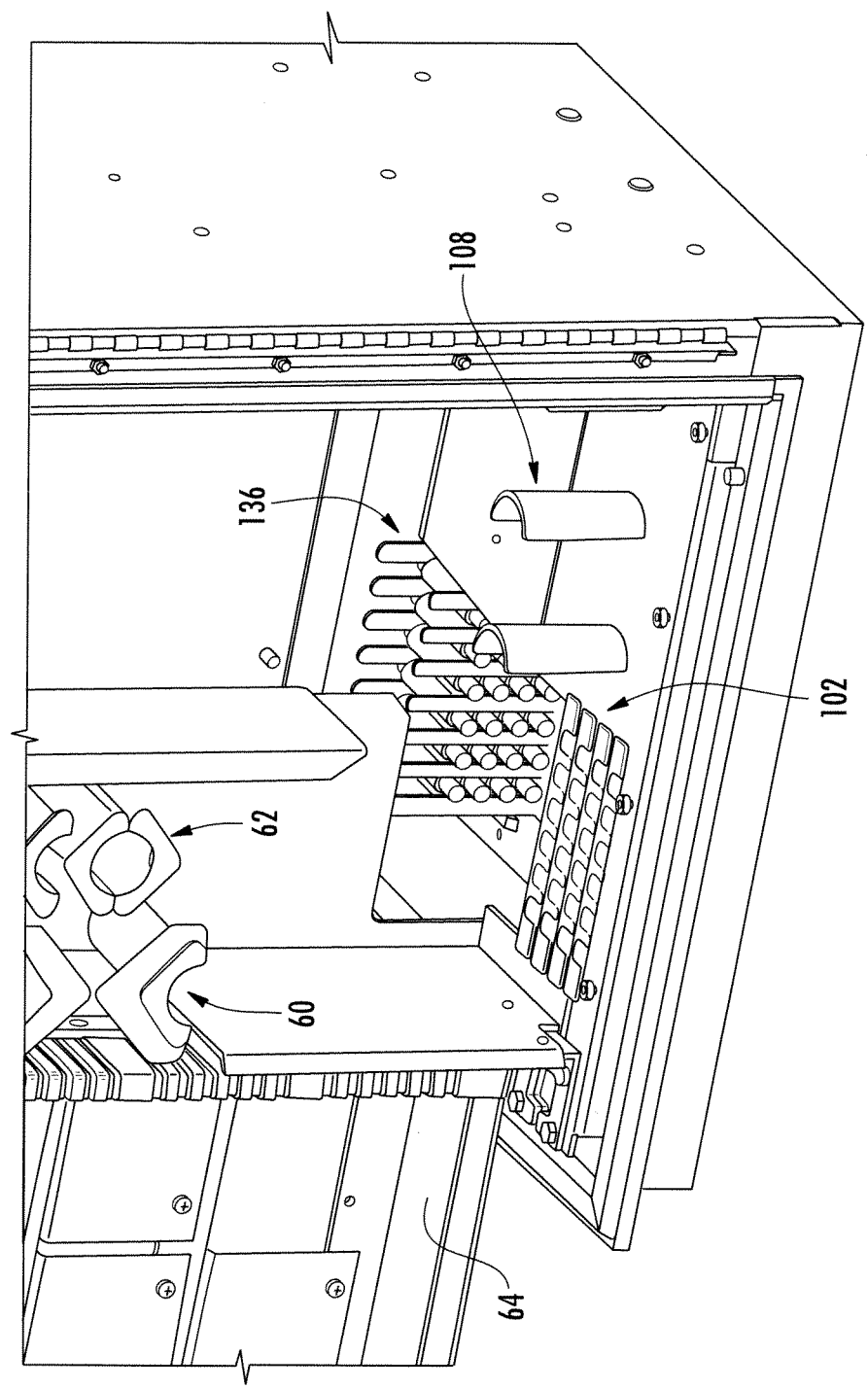
FIG. 21 is an enlarged side view with outer door and connector holder hinged frame removed for purposes of illustration.

FIGS. 17-20 show the interior of cabinet 10 behind support structure 64 when it is pivoted to the open position. Feeder cable and distribution cable enter cabinet 10 from below into this area. Suitable cable clamps, such as those indicated at 134, may be located on the inside of cabinet 10 to assist routing of the cables (as shown in FIG. 18). In addition, a cable transition holder 136 (most clearly seen in FIGS. 18 and 20) may be mounted in the bottom of cabinet 10. Cable transition holder 136 defines a plurality of parallel tubes in which subunits (e.g., 12F subunits) of the large distribution cable are further separated into its individual fibers. These fibers are then routed to component holder area 42 through grommet holes 102 as described above.

Figure 23:
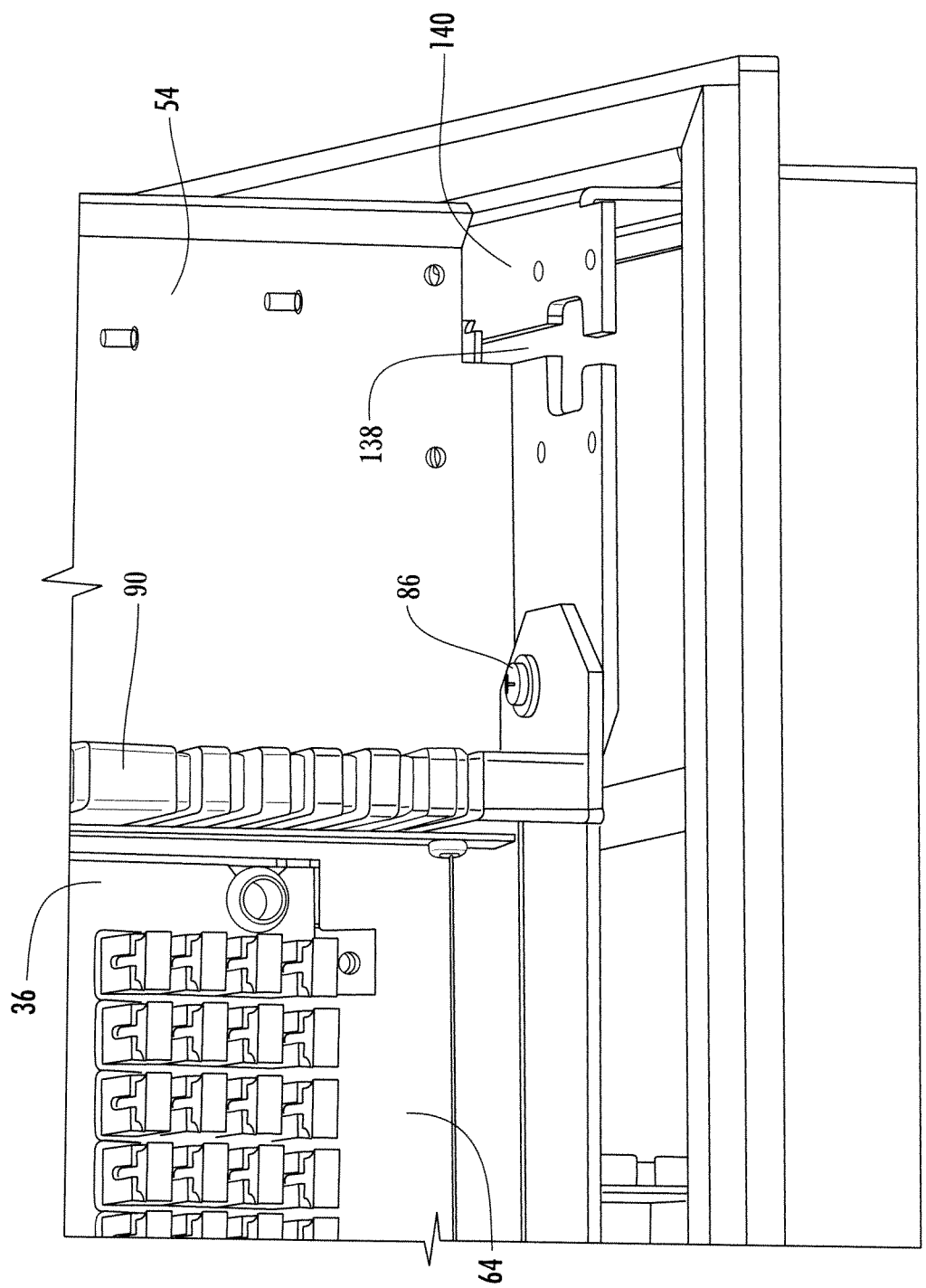
FIG. 23 is a view similar to FIG. 22 with the removable input bracket removed.

Referring now to FIGS. 22 and 23, an additional aspect of cabinet 10 will be described. In particular, as shown in FIG. 23, removal of bracket 74 reveals a cable passage 138 and a gap 140 defined in structure 54. This allows the service provider to "reskin" cabinet 10 when it is damaged without disrupting service. In particular, the optically connected components can be moved around and into the bottom of the cabinet without being disconnected. The cables, while still connected, are moved through passage 138 and gap 140. After the repair is completed, the process can be reversed.

It can thus be seen that the present invention provides an improved exterior fiber distribution cabinet having various advantages in comparison with the prior art. While preferred embodiments of the invention have been shown and described, modifications and variations may be made thereto by those of ordinary skill in the art without departing from the spirit and scope of the present invention. In addition, it should be understood that aspects of the various embodiments may be interchanged, in whole or in part. Furthermore, those of ordinary skill in the art will appreciate that the foregoing description is by way of example only, and is not intended to be limitative of the invention as further described in the appended claims.

What is claimed is:

1. A fiber distribution cabinet comprising:
   an outer shell having at least one door for accessing an interior thereof;
   a module support frame located inside said outer shell;
   at least one input distribution module attached to said module support frame, said input distribution module having a plurality of input distribution connector adapters;
   at least one optical splitter module attached to said support frame, said optical splitter module having a plurality of splitter connector adapters;
   a connector holder support frame; and
   a plurality of removable connector holders carried by said connector holder support frame, each of said connector holders configured for maintaining a multiplicity of output connectors such that a selected output connector is inaccessible if an associated one of said connector holders is carried by said connector holder support frame but is accessible if said associated one of said connector holders is removed from said connector holder support frame.

2. A fiber distribution cabinet as set forth in claim 1, wherein said module support frame is configured to define a plurality of module attachment locations at which a respective one of said at least one input distribution module or said at least one optical splitter may be attached.

3. A fiber distribution cabinet as set forth in claim 2, wherein said module support frame has a multiple of said module attachment locations.

4. A fiber distribution cabinet as set forth in claim 2, wherein said module support frame is pivotally mounted inside said outer shell.

5. A fiber distribution cabinet as set forth in claim 4, wherein said module support frame pivots about a vertical axis.

6. A fiber distribution cabinet as set forth in claim 2, wherein said module support frame further includes a fiber guide structure defining a plurality of spaced apart slots for receipt of optical fibers passing therethrough.

7. A fiber distribution cabinet as set forth in claim 1, wherein said input distribution connector adapters of said at least one input distribution module and said splitter connector adapters of said at least one optical splitter are oriented toward the outside of said cabinet to facilitate access thereto by a technician.

8. A fiber distribution cabinet as set forth in claim 1, wherein said connector holder support frame is pivotally mounted in said outer shell to move between a first position in which said connector holders are inaccessible and a second position in which said connector holders are accessible.

9. A fiber distribution cabinet as set forth in claim 8, wherein said connector holder support frame has a panel defining a plurality of connector identification holes, each of said connector identification holes being in register with a respective connector tip location.

10. A fiber distribution cabinet as set forth in claim 8, wherein said connector holder support frame is pivotal about a horizontal axis.

11. A fiber distribution cabinet as set forth in claim 10, wherein said first position is a raised position and said second position is a lowered position.

12. A fiber distribution cabinet as set forth in claim 8, wherein said connector holders are removably mounted to said connector holder support frame in parallel with each other.

13. A fiber distribution cabinet as set forth in claim 12, wherein each of said connector holders is configured to maintain a plurality of said output connectors such that connector tips thereof are located at respective connector tip locations.

14. A fiber distribution cabinet as set forth in claim 13, wherein each of said connector holders has a plurality of ferrules for engagement by a corresponding one of said connector tips.

15. A fiber distribution cabinet as set forth in claim 1, further comprising a plurality of cable spools at fixed locations inside said outer shell for storage of excess lengths of optical fiber.

16. A fiber distribution cabinet as set forth in claim 15, wherein said plurality of cable spools each may have a semi-cylindrical structure.

17. A fiber distribution cabinet as set forth in claim 1, wherein said at least one door of said outer shell comprises first and second doors.

18. A fiber distribution cabinet as set forth in claim 17, wherein said first and second doors have distal edges that form a corner of said outer shell when said first and second doors are in a closed position.

19. A fiber distribution cabinet as set forth in claim 1, further comprising a removable input bracket mounted at a fixed location inside said outer shell such that removal of said input bracket permits an input feeder cable to remain connected while components of said cabinet are serviced.

20. A fiber distribution cabinet as set forth in claim 1, further comprising a riser skirt on which said outer shell is mounted.

21. A fiber distribution cabinet as set forth in claim 1, wherein:
   said outer shell has a box-like configuration with a front side, a back side, a right side, a left side, and a top; and
   said at least one door of said outer shell comprises first and second doors respectively located at said front side and said right side of said outer shell.

22. An optical fiber connector storage arrangement comprising:
   a connector holder support frame including a panel and a connector holder receiving structure;
   said panel defining a plurality of connector identification holes;
   a plurality of removable connector holders located in said connector holder receiving structure;
   said connector holders being adapted to maintain a plurality of optical fiber connectors such that connector tips thereof are located at respective connector tip locations; and said connector tip locations each being in register with a respective one of said connector identification holes, wherein said connector holders are light transmissive at said connector tip locations.

23. An optical fiber connector storage arrangement as set forth in claim 22, wherein each of said connector holders has a plurality of tip ferrules at respective of said connector tip locations.

24. An optical fiber connector storage arrangement as set forth in claim 23, wherein said connector holder receiving structure has a length greater than a width thereof.

25. An optical fiber connector storage arrangement as set forth in claim 21, wherein said removable connector holders are situated in parallel with each other in said connector holder receiving structure.

26. An optical fiber connector storage arrangement as set forth in claim 22, wherein said connector holders each have at least one deflectable retention arm for engaging said connector holder receiving structure.

27. An optical fiber connector storage arrangement as set forth in claim 26, wherein said at least one deflectable retention arm comprises first and second deflectable retention arms.

28. An optical fiber connector storage arrangement as set forth in claim 22, wherein said panel comprises indicia located adjacent respective of connector identification holes are to facilitate locating a corresponding connector being maintained in one of said connector holders.

29. An optical fiber connector storage arrangement as set forth in claim 28, wherein said indicia is an alphanumeric identifier.

30. An optical fiber connector storage arrangement comprising:
 a connector holder support frame including a panel and a connector holder receiving structure;
 said panel defining a plurality of connector identification holes;
 a plurality of removable connector holders located in said connector holder receiving structure;
 said connector holders being adapted to maintain a plurality of optical fiber connectors such that connector tips thereof are located at respective connector tip locations; and
 said connector tip locations each being in register with a respective one of said connector identification holes, wherein said connector holders are formed of a transparent polymeric material.

31. A method of attaching an output connector to an optical splitter in a fiber distribution cabinet, said method comprising steps of:
 opening said fiber distribution cabinet to reveal a connector holder support frame;
 moving said connector holder support frame from a first position in which a plurality of connector holders carried by said connector holder support frame are inaccessible to a second position in which said connector holders are accessible;
 removing a selected one of said connector holders in which said output connector is maintained from said connector holder support frame;
 after removal of said selected one of said connector holders, removing said output connector from said selected one of said connector holders;
 attaching said output connector to a socket of said optical splitter; and
 replacing said selected one of said connector holders at said connector holder support frame after said output connector has been removed therefrom.

32. A method as set forth in claim 31, further comprising steps of:
 moving said connector holder support frame from said second position to said first position; and
 closing said fiber distribution cabinet.

* * * * *